United States Patent [19]
Satoh et al.

[11] Patent Number: 4,767,505
[45] Date of Patent: Aug. 30, 1988

[54] METHOD OF ROTATIONALLY MOLDING A SYNTHETIC RESIN DOLL

[75] Inventors: Yasuta Satoh, Tokyo; Hiroshi Tsuchihashi, Funabashi; Saburo Tani, Tokyo, all of Japan

[73] Assignee: Takara Co., Ltd., Tokyo, Japan

[21] Appl. No.: 896,389

[22] Filed: Aug. 13, 1986

Related U.S. Application Data

[62] Division of Ser. No. 749,578, Jun. 27, 1985, Pat. No. 4,629,409.

[30] Foreign Application Priority Data

Oct. 17, 1984 [JP] Japan ................. 59-216271

[51] Int. Cl.⁴ ............ B29C 41/04; B29C 41/52
[52] U.S. Cl. ................. 264/39; 264/40.1; 264/311; 264/334; 425/137; 425/165; 425/DIG. 201; 425/DIG. 57
[58] Field of Search ........... 264/39, 310, 311, 40.5, 264/40.7, 318, 304, 334, 336, 2.1, 270, 297.1, 297.3, 297.8, 40.1, 221, 314, 317, DIG. 44; 425/165, 436 R, 430, DIG. 27, DIG. 44, DIG. 201, DIG. 57, 137, 165; 901/6, 8, 14, 16, 31, 44, 46; 414/1, 729, 732

[56] References Cited

U.S. PATENT DOCUMENTS

| | | | |
|---|---|---|---|
| 2,917,776 | 12/1959 | Dorman et al. | 264/310 |
| 3,118,176 | 1/1964 | Freedman et al. | 264/39 |
| 3,136,831 | 6/1964 | Zinn | 264/317 |
| 3,522,838 | 8/1970 | Ott | 425/165 |
| 3,655,317 | 4/1972 | Funkhouser et al. | 425/165 |
| 4,028,039 | 6/1977 | de Putter | 425/436 R |
| 4,050,870 | 9/1977 | Frigo | 425/436 R |
| 4,167,382 | 9/1979 | Freedman et al. | 264/310 |
| 4,280,976 | 7/1981 | Von Holdt | 425/438 |
| 4,293,268 | 10/1981 | Mink | 901/31 |
| 4,465,651 | 8/1984 | Godschalk, Jr. | 264/318 |
| 4,655,676 | 4/1987 | Jannborg | 901/31 |
| 4,690,626 | 9/1987 | Krzepinski | 425/429 |

FOREIGN PATENT DOCUMENTS 43-8627 4/1968 Japan ................. 425/165

Primary Examiner—James Lowe
Assistant Examiner—J. F. Durkin
Attorney, Agent, or Firm—Price, Gess & Ubell

[57] ABSTRACT

A method for rotationally molding synthetic resin dolls using an automatic control mechanism, a mold holding mechanism, a robot mechanism having a mold cover opening and closing means, a mold releasing means for releasing a molded product from the mold, mold release detecting and cleaning means; a raw material charging means, and a heating and cooling means. The method includes detecting the mold release of the molds opened by the mold holding mechanism and cleaning the molds. Quantitatively charging a raw material of thermoplastic synthetic resin into the mold in a solid state and closing the cover. Inserting the mold into a heating furnace of a heating mechanism and rotating the mold to form a synthetic resin molten skin layer on the inner wall of the mold. Once the layer is formed the mold is moved into a cooling chamber of a cooling mechanism and the skin layer is solidified while continuing to rotate the mold. When the layer is solidified the mold is moved to the mold releasing unit. The cover of the mold is opened and the molded product is removed.

4 Claims, 33 Drawing Sheets

303

303

FIG.29
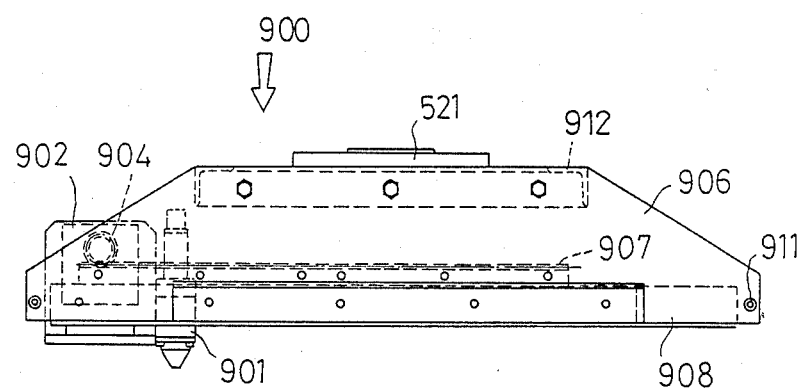
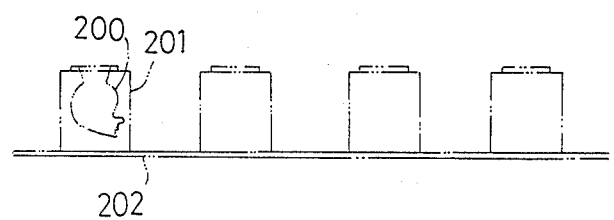

METHOD OF ROTATIONALLY MOLDING A SYNTHETIC RESIN DOLL

This is a division of application Ser. No. 06/749,578 filed on June 27, 1985, now U.S. Pat. No. 4,629,409.

BACKGROUND OF THE INVENTION a. Field of the Invention

This invention relates to a method of automatically fabricating a molded product of thermoplastic resin and a molding machine therefor and, more particularly to a method of economically molding a head or other portions of a doll and a molding machine therefor.

b. Description of the Prior Art

In a conventional molding machine which uses a mold for molding a thermoplastic resin product such as, for example, a thermoplastic resin doll, works of charging a raw material, opening and closing the cover of a mold, heating, cooling and removing the molded product have been frequently required for manual operations, and desired to be mechanized and have been automated.

SUMMARY OF THE INVENTION

An object of this invention is to provide a method of automatically molding a synthetic resin doll which does not require manual operations, thereby enhancing the working effects in the working environments.

Another object of this invention is to provide a method of automatically molding economically thermoplastic resin dolls which can fabricate the dolls in a mass production in a continuous molding technique.

Still another object of this invention is to provide a method of automatically molding thermoplastic resin dolls which can inexpensively mold the dolls with high quality.

Still another object of the invention is to provide a molding machine for molding thermoplastic resin dolls which can carry out the abovementioned method.

The method of and molding machine for automatically molding a synthetic resin doll according to this invention includes charging a constant quantity of a raw material of thermoplastic synthetic resin in a solid state in a mold and thermally molding the resin. The present invention can be accomplished through the steps of charging the raw material in a mold, opened at its cover, closing the cover, inserting the mold into a heating furnace, revolving the mold in a rotation system to form a molten skin layer on the inner wall of the mold, then moving the mold into a cooling chamber to cool and solidify the skin layer while revolving the mold, moving the mold to a mold removing unit to remove the cover of the mold and remove the molded product.

The foregoing objects and other objects as well as the characteristic features of the invention will become more fully apparent and more readily understandable by the following description and the appended claims when read in conjunction with the accompanying drawings.

BRIEF DESCRIPTION OF THE DRAWINGS

FIG. 29 is a front view of the charging unit;

DESCRIPTION OF THE PREFERRED EMBODIMENTS

Figure 1:
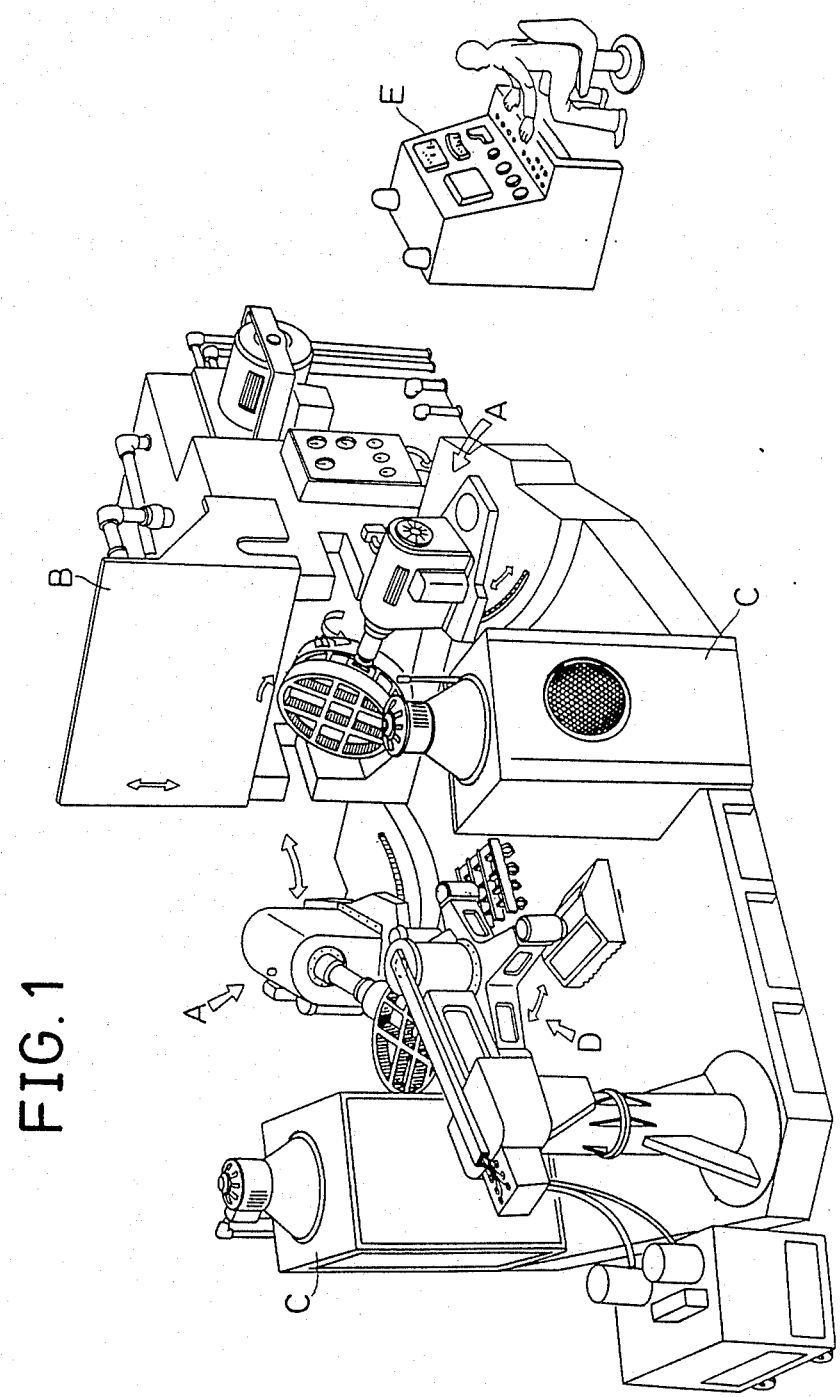
FIG. 1 is a perspective view of the entire molding machine of the invention.

An embodiment of the present invention will now be described in detail with reference to the accompanying drawings.

A molding machine of the invention comprises two mold holding mechanisms A, A of molds, a heating furnace B as a heating mechanism, two cooling chambers C, C as cooling mechanism, and a robot mechanism D for charging a raw material in the molds and removing molded products. The works are automatically controlled by a control board E of an automatic control mechanism.

The heating mechanism and hence the heating furnace B is provided at the position where the turning locuses of the two molds cross between the two mold holding mechanisms A and A. The cooling mechanism, i.e., the cooling chambers C, C are respectively provided on the turning locuses of the molds exclusively for the mechanism A, A. The robot mechanism D is provided to cross the two locuses of the molds of the holding mechanisms A, A, formed when the molds are turned from the furnace B to the chambers C, C, and has a mold cover opening and closing unit 600 as a mold cover opening and closing mechanism, a mold releasing unit 700 as a mold releasing mechanism, a mold release detecting and blowing unit 800 as a mold release detecting and cleaning mechanism, and a supporting unit 500 as a supporting mechanism for suspending and holding the units 700, 800 and 900.

Figure 2:
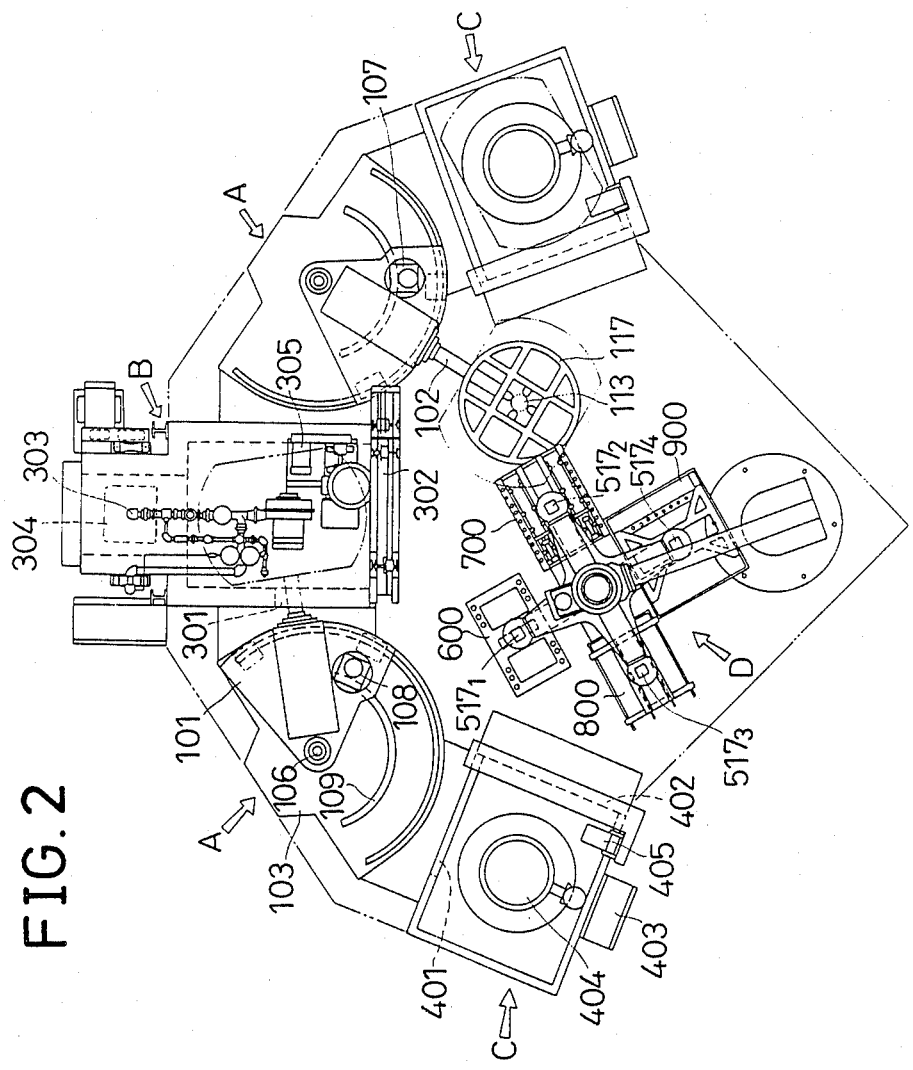
FIG. 2 is a plan view of the machine.
Figure 3:
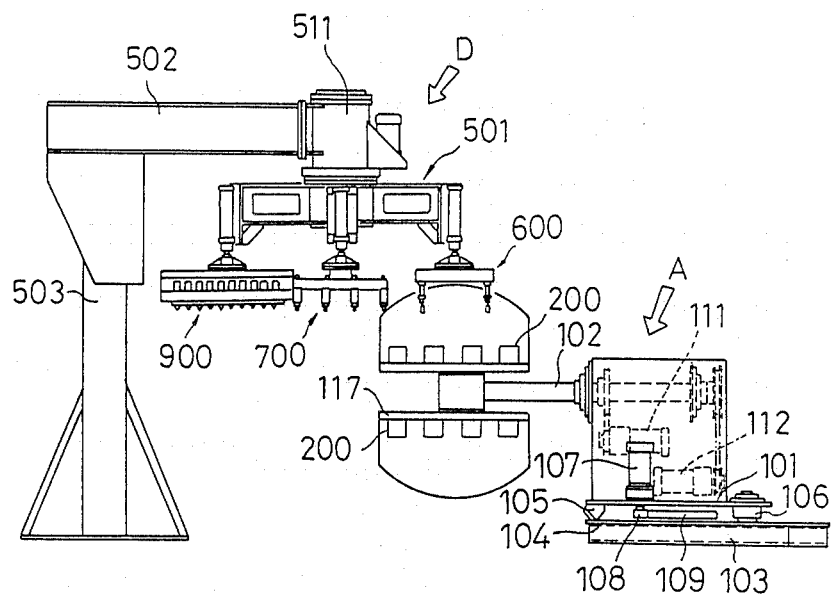
FIG. 3 is a side view of the part of the machine.
Figure 4:
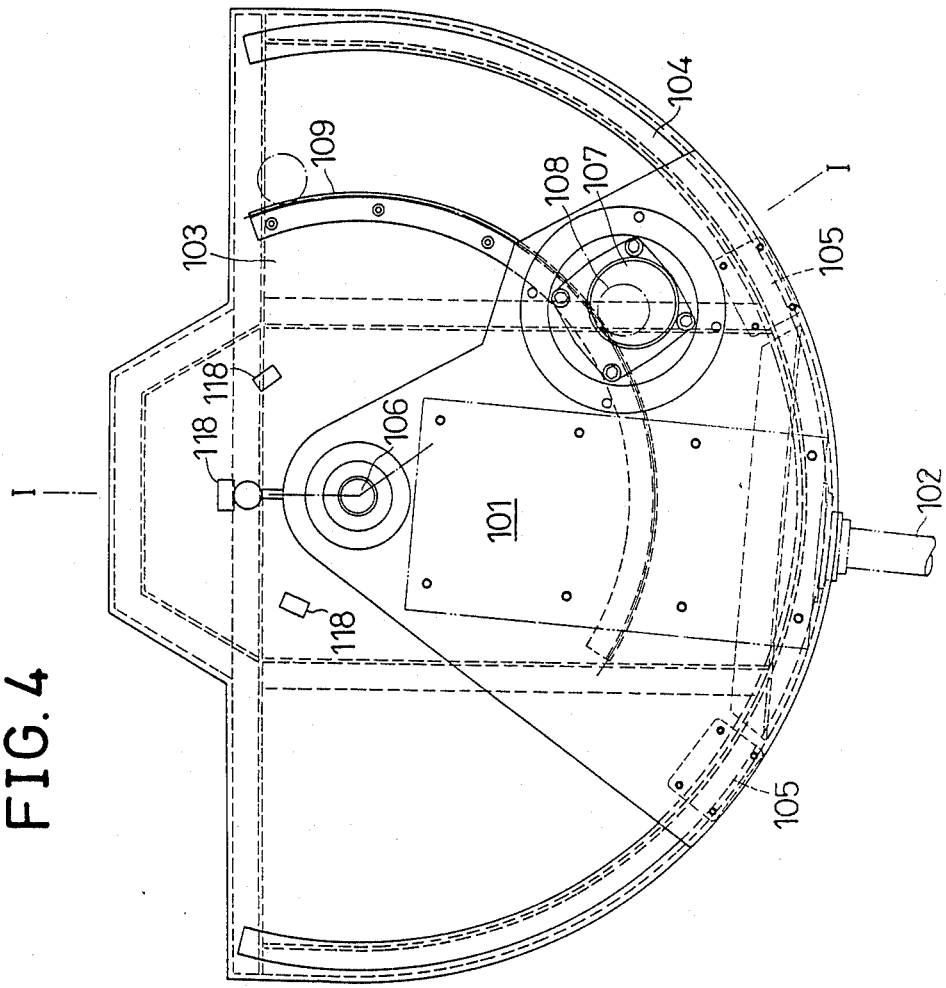
FIG. 4 is a plan view of the part of a mold holding mechanism.
Figure 5:
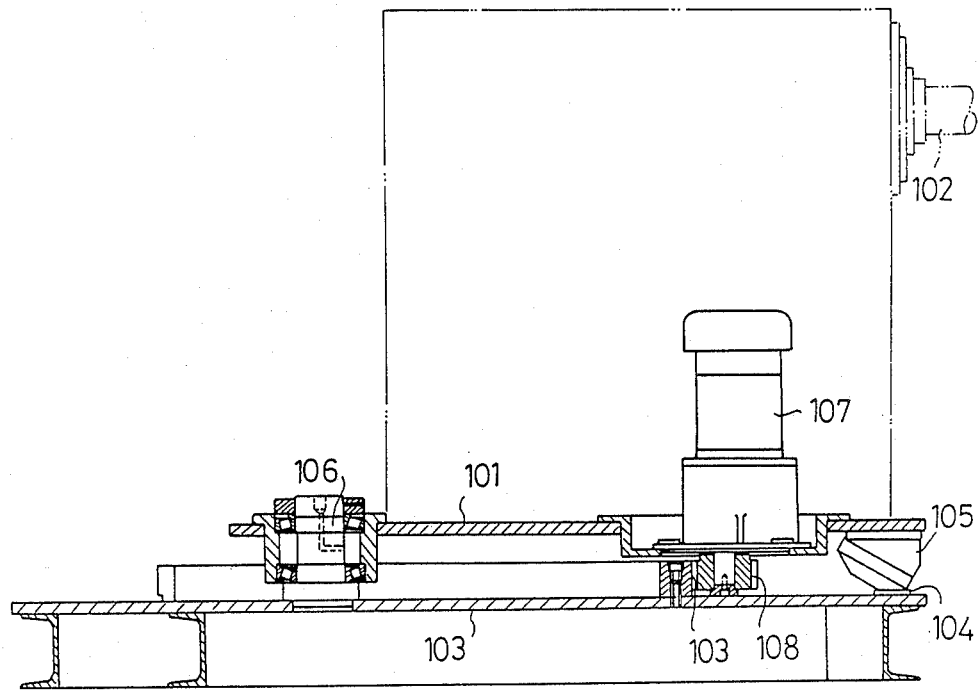
FIG. 5 is a sectional view, taken along the line I—I in FIG. 4.

Referring to FIGS. 1 and 2, the mold holding mechanism A is constructed by mounting a mold 200 through a spider 117 of a rotary plate at the end of an arm 102 provided on a turntable 101 (FIGS. 3 to 6).

More particularly, the turntable 101 is supported by rollers 105, 105 which roll on rails 104 laid on a base 103, and a supporting pin 106 stood on the base 103, coupled to a geared motor 108 with a brake placed on the turntable 101, and is turntable on the base 102 with the pin 106 as a center in such a manner that a pinion 108 provided on the lower surface of the turntable 100 is engaged in mesh with a rack 109 formed on an arcuate with the pin 106 as a center.

The arm 102 is supported to a supporting base 110 provided on the turntable 101, coupled through a double shaft arm formed of an outer shaft $102_1$ and an inner shaft $102_2$ with geared motors 111, 112 with brakes, respectively, and mounted at the end with an orthogonal shaft, perpendicularly crossing the arm 101, i.e., a spider spindle 113. The spindle 113 is coupled through a cylinder 114 with the inner shaft $102_2$, and through miter gears 115, 116 with the outer shaft $102_2$, thereby enabling to rotate around its own axis at the axis of the spindles 113 as a center and around the axis of the arm 102 as a center.

The spiders 117, 117 of the rotary plates are mounted at both ends of the spindle 113, and a plurality of molds 200 are respectively mounted on opposite sides to the spindles 113 of the spiders 117, 117.

Figure 6:
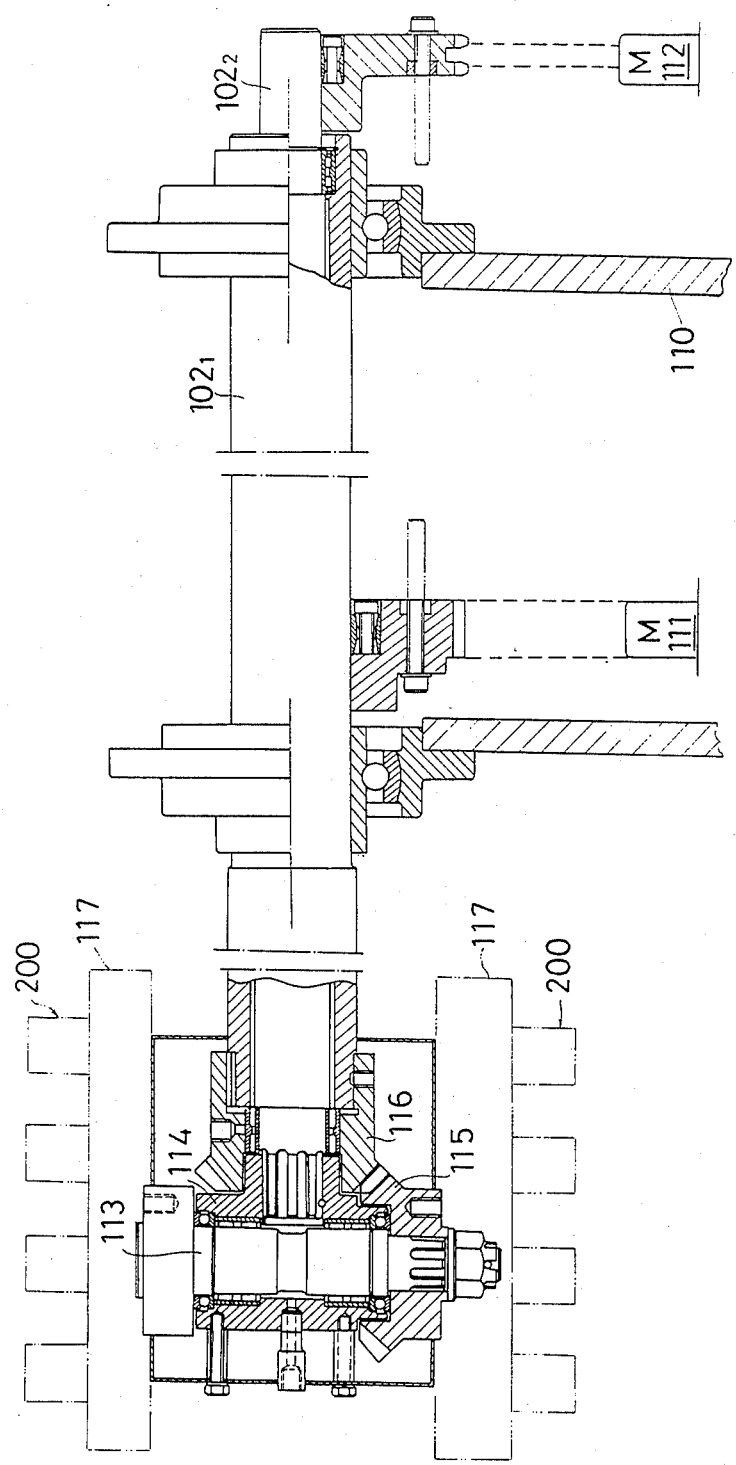
FIG. 6 is a fragmentary sectional view of the part of the mold holding mechanism.

Referring to FIG. 6, the turntable 101 is provided on the base 103 with limit switches 118 capable of stopping the turntable 101 at the raw material charging and mold releasing position, heating position and cooling position of the mold group 200, and stopped and locked by the braking operations of the motors 107.

A control unit is provided in the drive unit of the arm 102 so as to be able to stop and lock the arm 102 when the mold group 200 are disposed horizontally in a predetermined arraying direction at the raw material charging and mold releasing position, and can control the rotating speed of the spindle 112 and the moving speed of the turntable 101.

Ten molds 200 are aligned fixedly in one row in a frame 201, and four frames 201 are aligned fixedly in parallel with a mounting plate 202, which is secured fixedly to the spider 117.

Figure 17:
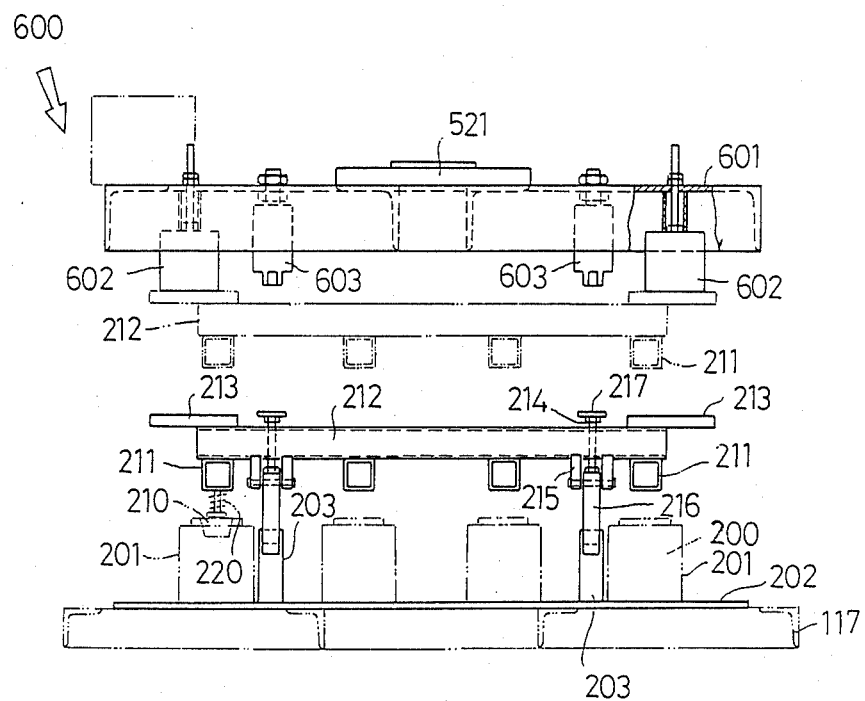
FIG. 17 is an explanatory view of the operation of the unit.
Figure 18:
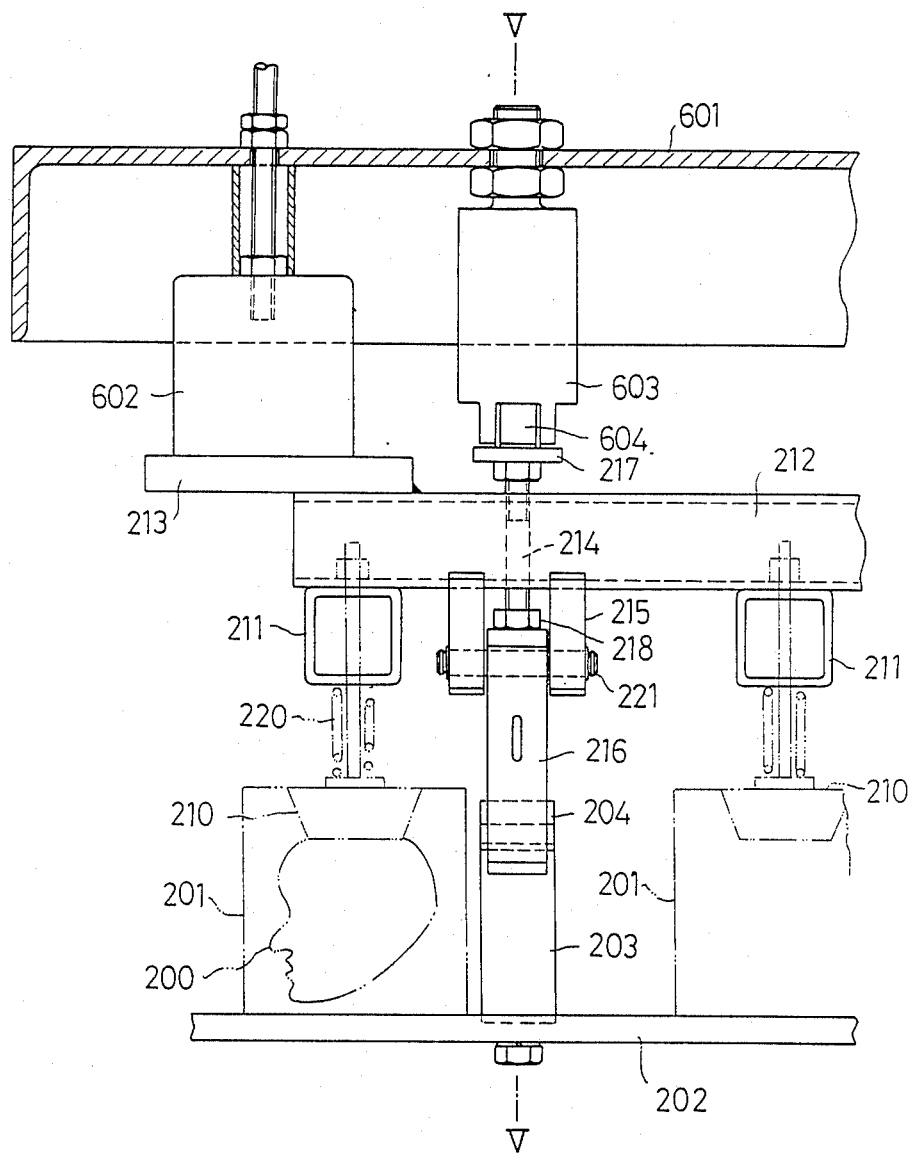
FIG. 18 is an enlarged detailed explanatory view of the part of the unit.

Clamp columns 203 are projected from the plate 202, and have at the tops connection units 204 (FIGS. 17 and 18).

Figure 16:
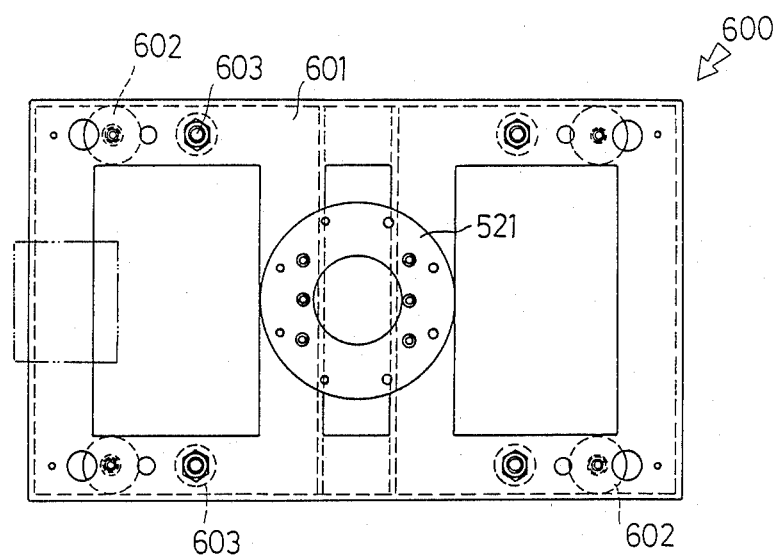
FIG. 16 is a plan view of a mold cover opening and closing unit.
Figure 19:
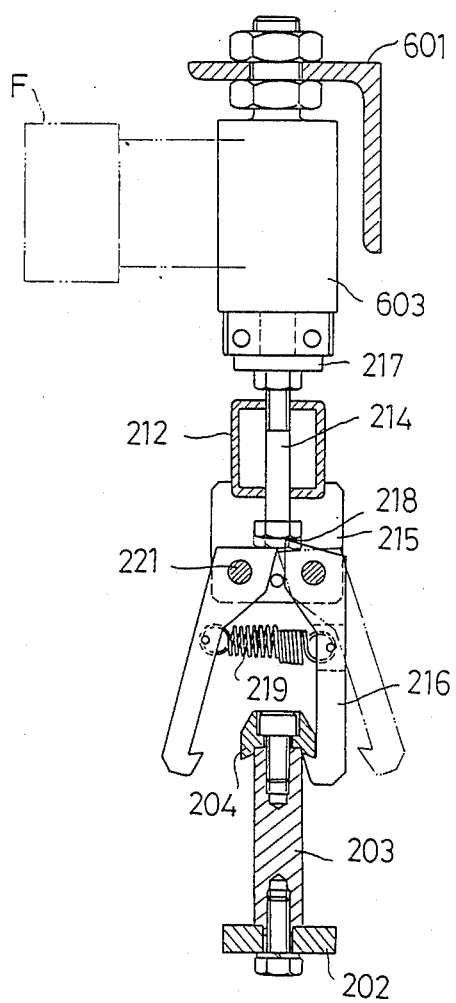
FIG. 19 is a sectional view, taken along the line V—V in FIG. 18.
Figure 20:
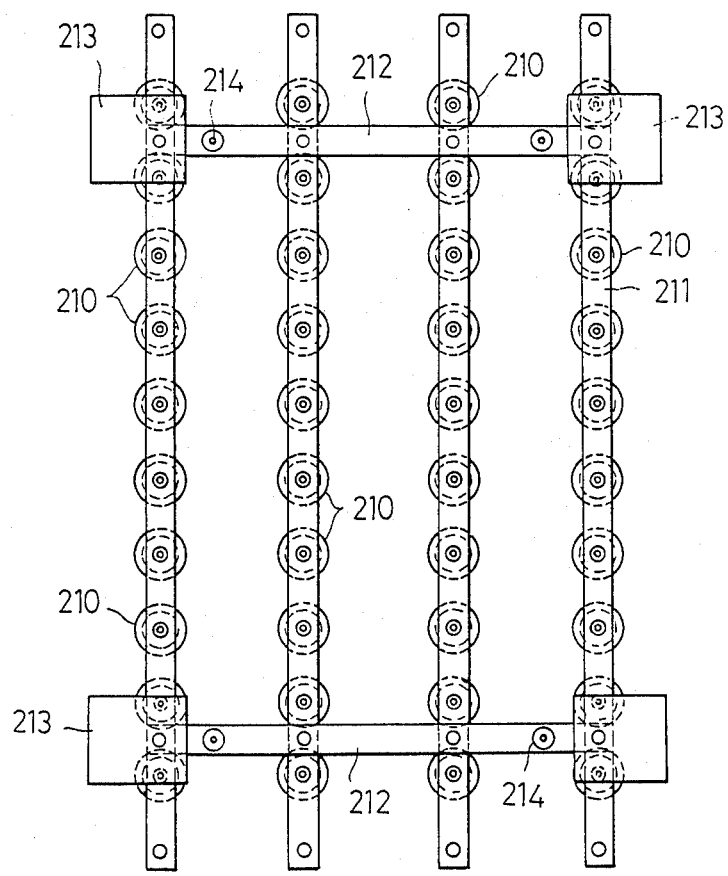
FIG. 20 is a plan view of mold group.

A cover 210 for the mold is disposed on the mold 200. Referring to FIG. 20, ten covers 210 are held elevationally movably upward and downward at the respective shanks at four bars 211, and each cover 210 has a spring 220 energized to increase an interval between the upper surface of the cover and the bar 211. Another bar 212 is provided perpendicularly to the bar 211 at the top of the bar 211. A pair of clamp hooks 216 are pivotally hung via pins 221 through clamp mounting plates 215 at the position to be engaged with the columns 202 from the bars 212, and a spring 219 is mounted to be energized to reduce an interval between the hooks 216 and 216. Referring to FIGS. 18 and 19, columns 214 are arranged at the positions on the upper surfaces of the hooks 216, 216 on the bars 212. The columns 214 can be elevationally moved upward and downward, and has at the top a contacting portion 217 with the cover opening and closing unit 600 and at the bottom contacting portions 218 with the hooks 216, 216. The gravity of the column 214 is smaller than the recoiling strength of the spring 219. The column 214 is placed on and supported by the closed hooks 216, 216. When the column 214 is pressed down against the recoiling strength of the spring 219, the hooks 216, 216 are opened. Further, magnetic pieces 213, 213 are secured to be capable of contacting an electromagnet 602 on the upper surfaces of the both ends of the bar 212 (FIGS. 16 to 18).

Figure 7:
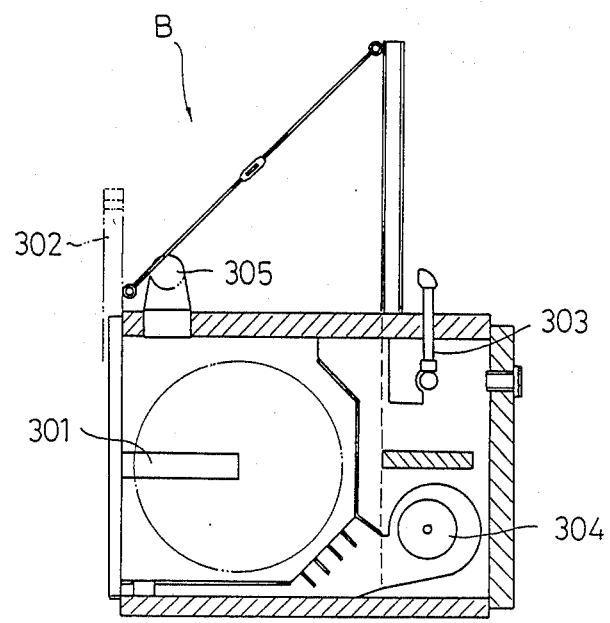
FIG. 7 is a longitudinal sectional view of a heating furnace.

The furnace B has a heat source the burner in a forcible blast circulation type oven, has a size that the spider 117 mounted with the mold 200 can rotate at the arm 102 and the spindle 113 as a central axis, has notches 301, 301 capable of turning the arms 102 at both sides, and a door 302 provided to be able to elevationally move upward and downward by a cylinder secured at one end of a chain to a piston at an inlet for passing the mold 200. A burner 303 and a circulation fan 304 is provided in the furnace to blow a blast to the mold, and an exhaust fan 305 is provided on the ceiling of the furnace (FIG. 7).

Figure 8:
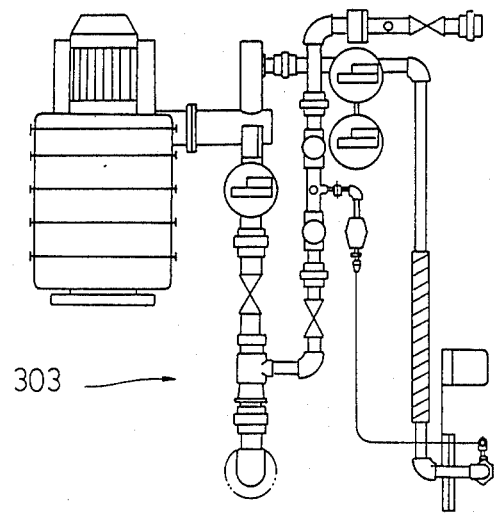
FIG. 8 is a plan view of a burner.
Figure 9:
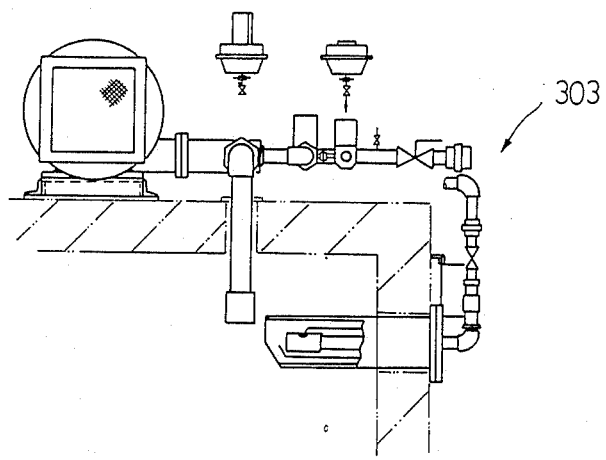
FIG. 9 is a front view of the burner.

The burner 303 employs a downward combustion type propane gas burner. Temperature detectors for automatically controlling the temperature, recording the temperature and digitally displaying the temperature are provided in the furnace. The temperature may be automatically controlled and the heating time can also be controlled by a timer (FIGS. 8 and 9).

The notches 301, 301 are closed by covers when the furnace B is operating, and the opening and closing of the door 302, the turning of the arm 102, the operations of the fan 304 and 305, and the ignition of the burner 303 can also be controlled cooperatively.

The cooling chamber C has a size that can allow the spider 117 mounted with the mold 200 to rotate, and has a notch 401 as an exit of the arm 102 and an exit of the mold 200. The exit of the mold 200 is provided with a shutter 402 as a curtain to be openably operated by a motor 405, and a hanging curtain (not shown) is hung in the notch 401.

Figure 10:
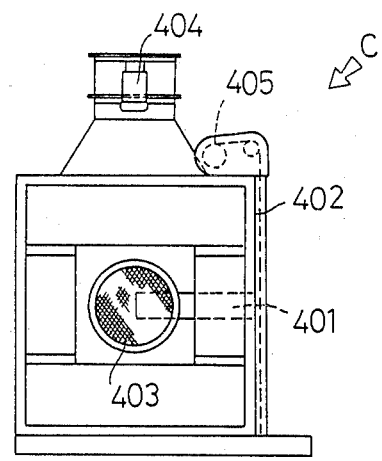
FIG. 10 is a side view of a cooling chamber.

A nozzle for spraying pressure water and a drain pit are provided in the cooling chamber C, a fan 403 for air cooling and splashing droplets is provided at the side, capable of gradually cooling by both water and air cooling, and an exhaust fan 404 is provided at the top for exhausting the hot air and steam generated by cooling (FIG. 10).

The operating times of the nozzle and the fan 403 are controlled by a timer, and the opening and closing of the shutter 402, the turning of the arm 102, and the operations of the nozzle and the fans are automatically controlled synchronously therewith.

Figure 11:
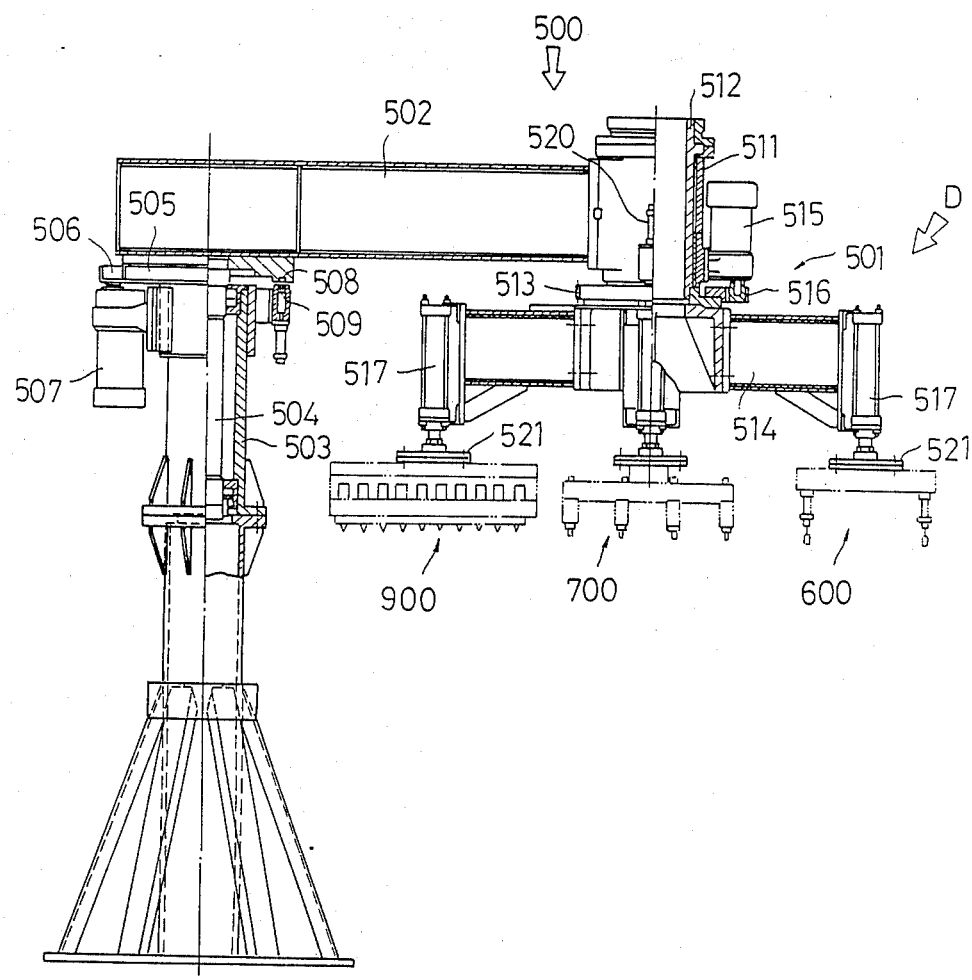
FIG. 11 is a fragmentary sectional side view of a robot mechanism.

The robot mechanism D has the mold cover opening and closing unit 600, the mold releasing unit 700, the mold release detecting and blowing unit 800, the raw material charging unit 900, and supporting unit 500 for suspending and supporting the units 600, 700, 800 and 900 (FIG. 11).

Figure 12:
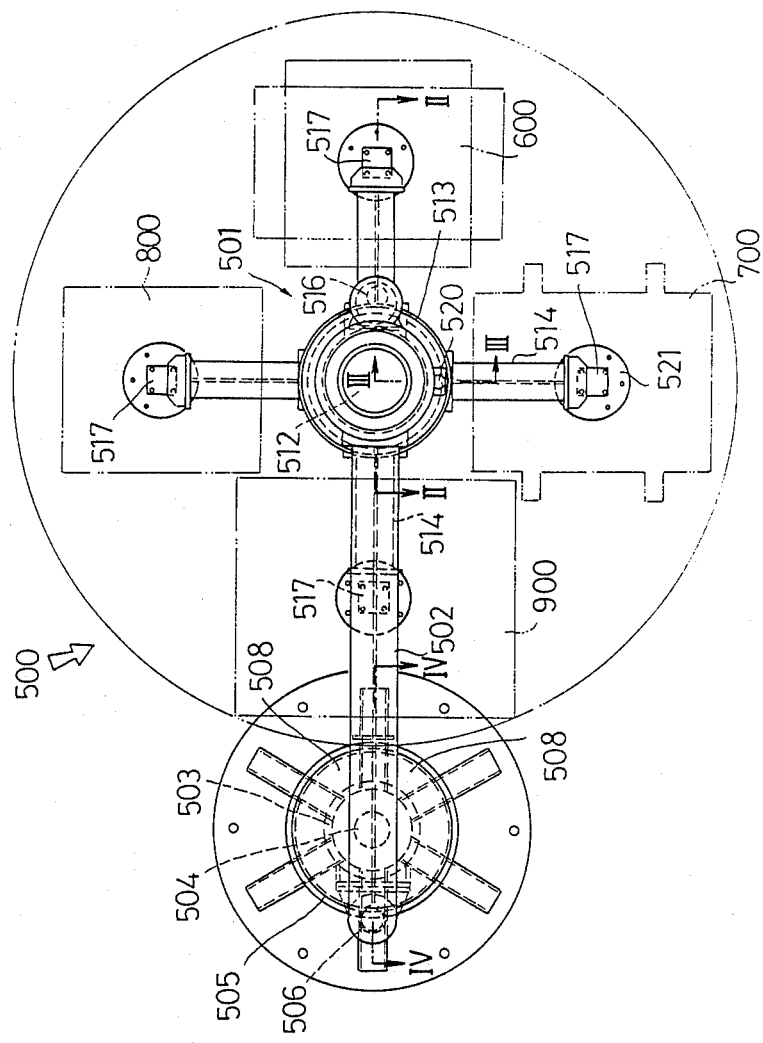
FIG. 12 is a plan view of the robot mechanism.
Figure 13:
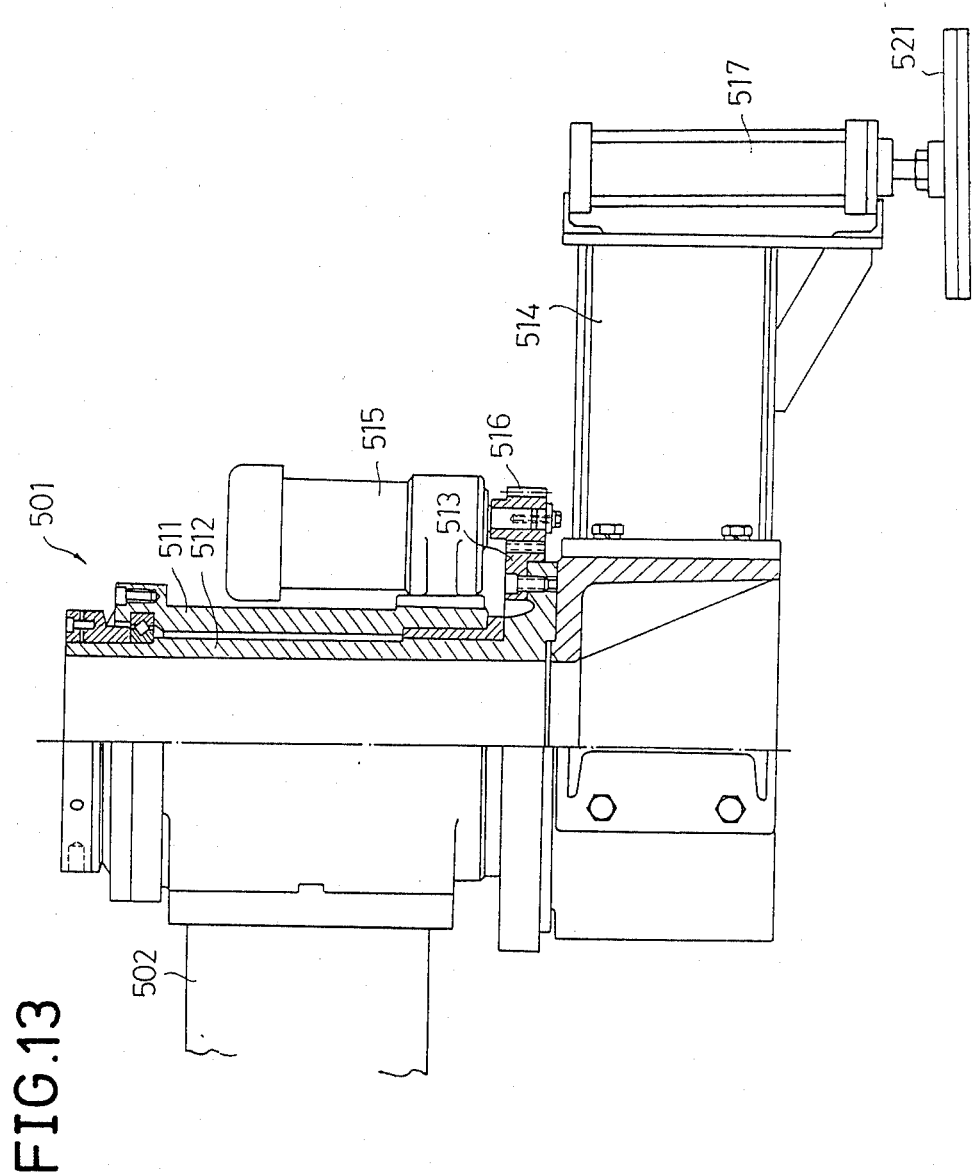
FIG. 13 is a sectional view, taken along the line II—II in FIG. 12.
Figure 14:
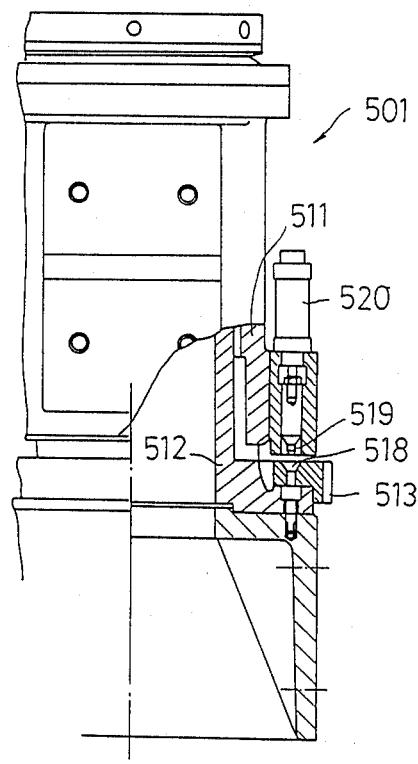
FIG. 14 is a sectional view, taken along the line III—III in FIG. 12.

The supporting unit 500 turnably couples an arm 502 having an indexing unit 501 at the end with the column 503, and disposes the units 600, 700, 800 and 900 at the molds (FIGS. 12 to 14).

Figure 15:
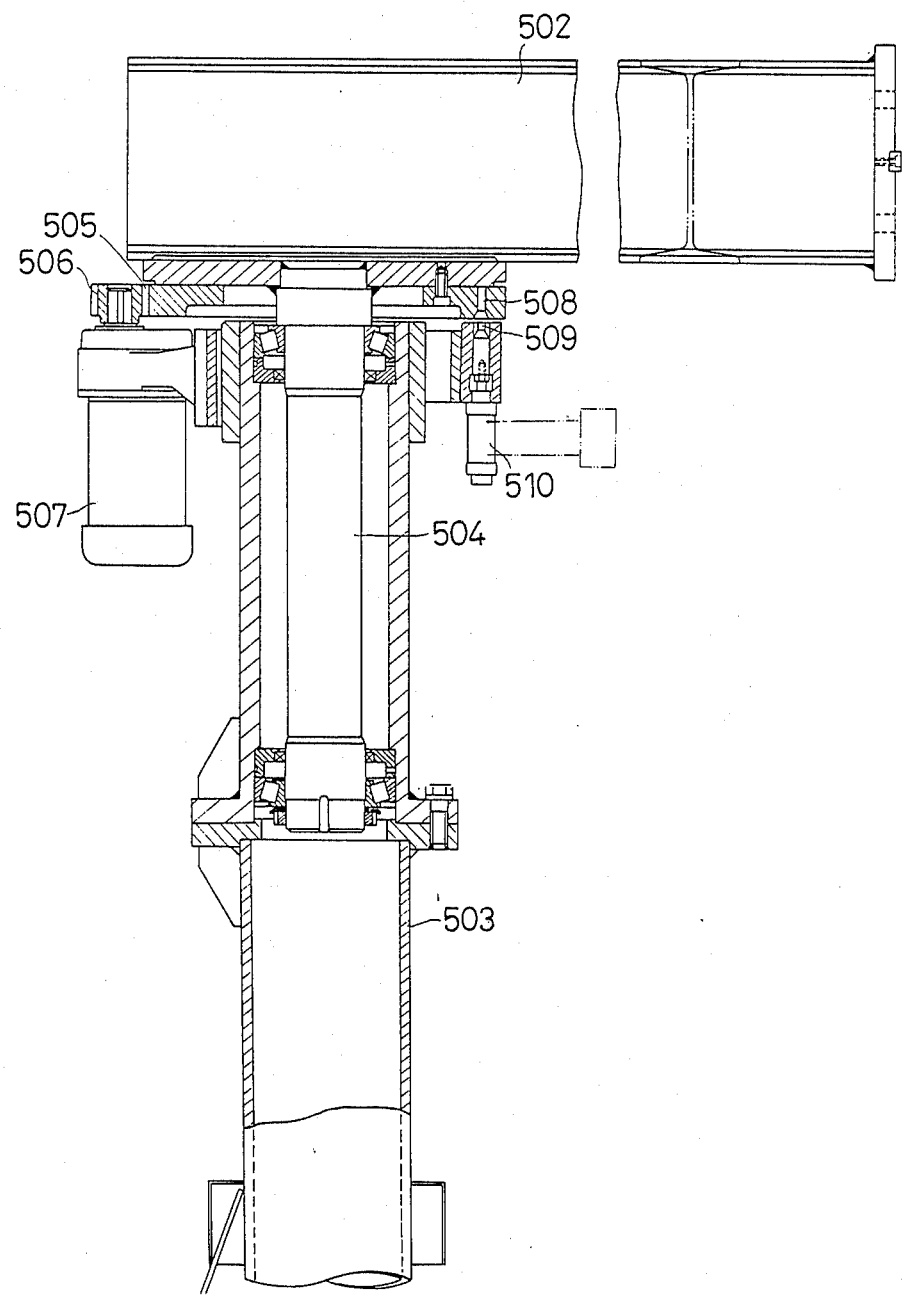
FIG. 15 is a sectional view, taken along the line IV—IV in FIG. 12.

More specifically, the arm 502 has a shaft 504 secured to the lower surface of one end thereof and a gear 505 concentrically with the shaft 504 to engage the shaft 504 rotatably with the hollow portion of the column 503. A pinion 506 engaged in mesh with the gear 505 is coupled at the top of the column 503 with a geared motor 507 with a brake (FIG. 15).

Pinholes 508, 508 are perforated at the lower surface of the gear 505, and lock pins 509 to be inserted into the pinholes 508 are provided on the top of the column 503. The lock pins 509 are mounted at the end of the piston of a cylinder 510, and the cylinder 510, which is secured to the column 503, is coupled to an operation fluid pressure source.

The indexing unit 501 is mounted through a cylindrical column 511 secured fixedly to the end of the arm 502. A shaft 512 is rotatably supported to the hollow portion of the column 511. A gear 513 is secured onto the peripheral surface of the lower end of the shaft exposed from the column 511, and four supporting arms 514 are secured radially from the center of the shaft 512.

A pinion 516 is engaged in mesh through a geared motor 515 with a brake secured to the column 511 with the gear 513 (FIG. 13).

Further, the same lock mechanism as that between the column 503 and the arm 502 is provided between the column 511 and the shaft 502. In other words, the pinholes 518 are formed at an interval of 90° on the upper surface of the gear 513, and lock pins 519 are secured to the end of the piston of the cylinder 520 secured with the column 511 (FIG. 14).

The four cylinders $517_1$, $517_2$, $517_3$, $517_4$ are respectively provided at the ends of the four supporting arms 514; mounting flanges 521 are respectively secured to the lower ends of the cylinders 517; and the units 600, 700, 800 and 900 are respectively coupled to the flanges 521 to be elevationally movable upward and downward.

The units 600, 700, 800 and 900 are secured to and hung from the positions of the flanges 521 convenient to perform the molding steps, and the cylinders 517, 520 are coupled to a hydraulic fluid pressure system which includes a compressor and valves capable of being hydraulically operated.

The rotation stopping positions of the arms 520 and the indexing units 510 are detected by limit switches, the rotating speed can be also controlled, and the operations of the robot mechanism D can be automatically operated by signals.

The mold cover opening and closing unit 600 is composed by securing the electromagnet 602 and a cylinder 603 to the frame 601, and hung by securing the frame 601 to the flange 521.

The electromagnet 602 is provided at the position to be contacted with the magnetic piece 213 of the bar 212, and the cylinder 603 is provided at the end of a piston rod 604 with the contacting portion 217 of the column 214.

The cylinder 603 is connected to an operating fluid pressure unit F, and the electromagnet 602 is connected to an operation power source (FIGS. 16 to 19).

The mold releasing unit 700 has ten chuck cylinders 702 hung from each of the four chuck cylinder mounting plates 701 installed between end plates 706 and 706, a pair of chuck saws 703 cantilevered to the lower ends of the cylinders 702 to a form a chuck holder group adapted for the array of the molds 200. The central two rows of the mounting plates $701_a$, $701_a$ are secured fixedly to hanging plates 704, 704, and the flanges 521 are respectively secured to the plates 704, 704 (FIGS. 21 to 24).

The cylinder 702 has at its top a pinion 711, and is coupled at the top and bottom of the pinion 711 with the two mounting plates 701, 701. The ends of the chuck saws 703 are secured via pins 712 to the ends of pistons 717 of the cylinders 702. The saws 703 are pivotally secured at the center via pins 713 to the mounting portions at the ends of the cylinders 702, and the chucks at the ends of the saws 703, 703 are opened and closed by the upward and downward movements of the piston 717 (FIG. 25).

Figure 21:
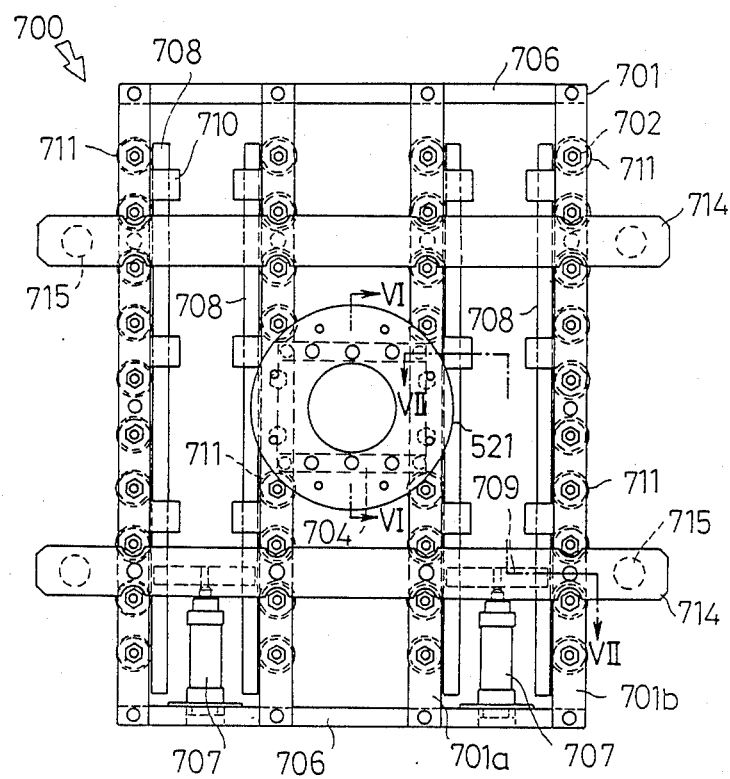
FIG. 21 is a plan view of a mold releasing unit.
Figure 22:
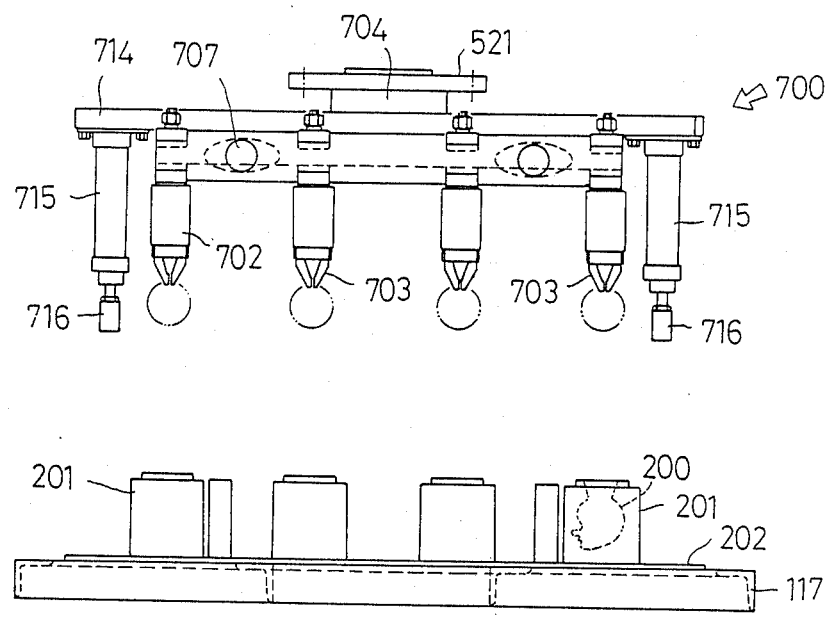
FIG. 22 is a front view of the releasing unit.
Figure 23:
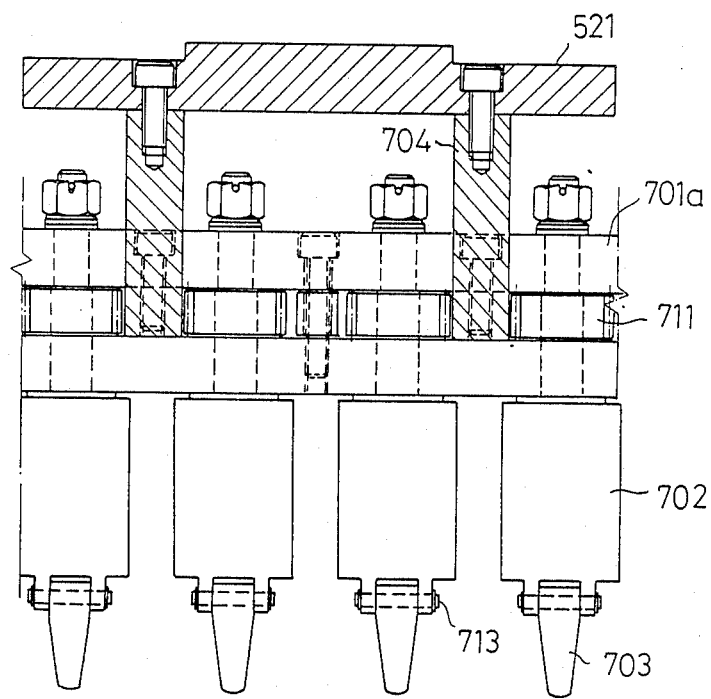
FIG. 23 is a sectional view, taken along the line VI—VI in FIG. 21.
Figure 24:
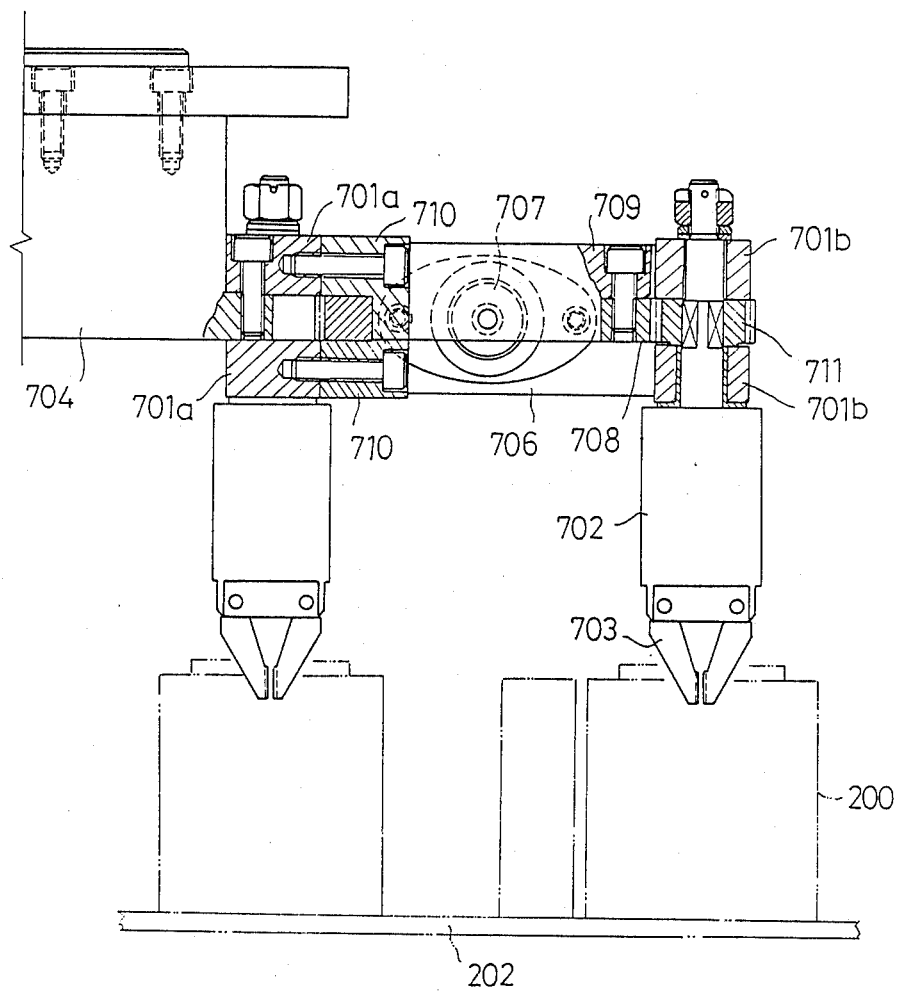
FIG. 24 is a sectional view, taken along the line VII—VII in FIG. 21.

Two mounting plates $701_b$ of the end side adjacent to the mounting plate $701_a$ of central side are formed as a set, and cylinders 707, 707 are horizontally provided between the plate $701_a$ and the plate $701_b$ of one end plate 706. A rack push plate 709 is provided at the end of the piston of the cylinder 707, and racks 708, 708 are coupled to both ends of the plate 709. The racks 708, 708 are engaged in mesh with the pinion 711 of the cylinder 707 at the opposed surfaces of a set of the plates $701_a$, $701_b$, and guide plates 710 are projected at several positions of the plate 701 (FIGS. 21 and 22).

Two lifting cylinder mounting plates 714 are coupled to the top of the plate 701 perpendicularly to the mounting plate, and a lifting cylinder 715 having a block 716 at the end of the piston is vertically suspended from both ends of the plates 714. The block 716 is disposed at the position capable of contacting the plate 202 mounted with the mold 200.

Figure 25:
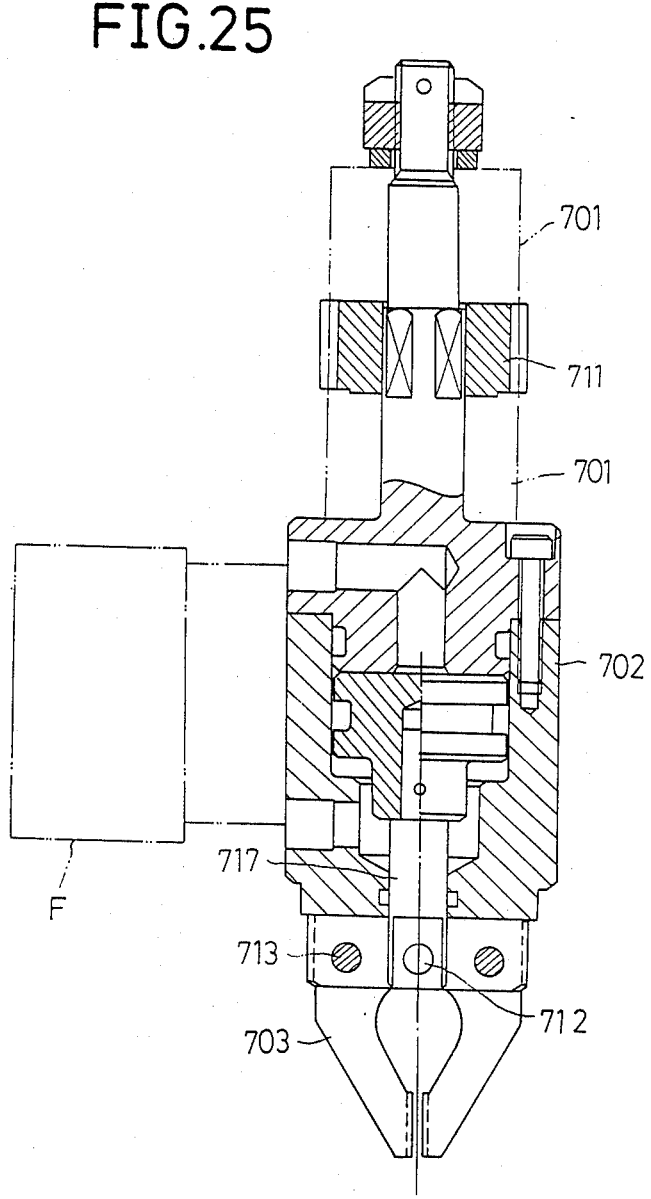
FIG. 25 is a fragmentary sectional front view of the part of the releasing unit.

The cylinders 702, 707, 715 are all coupled to a hydraulic fluid device F (FIG. 25).

Figure 26:
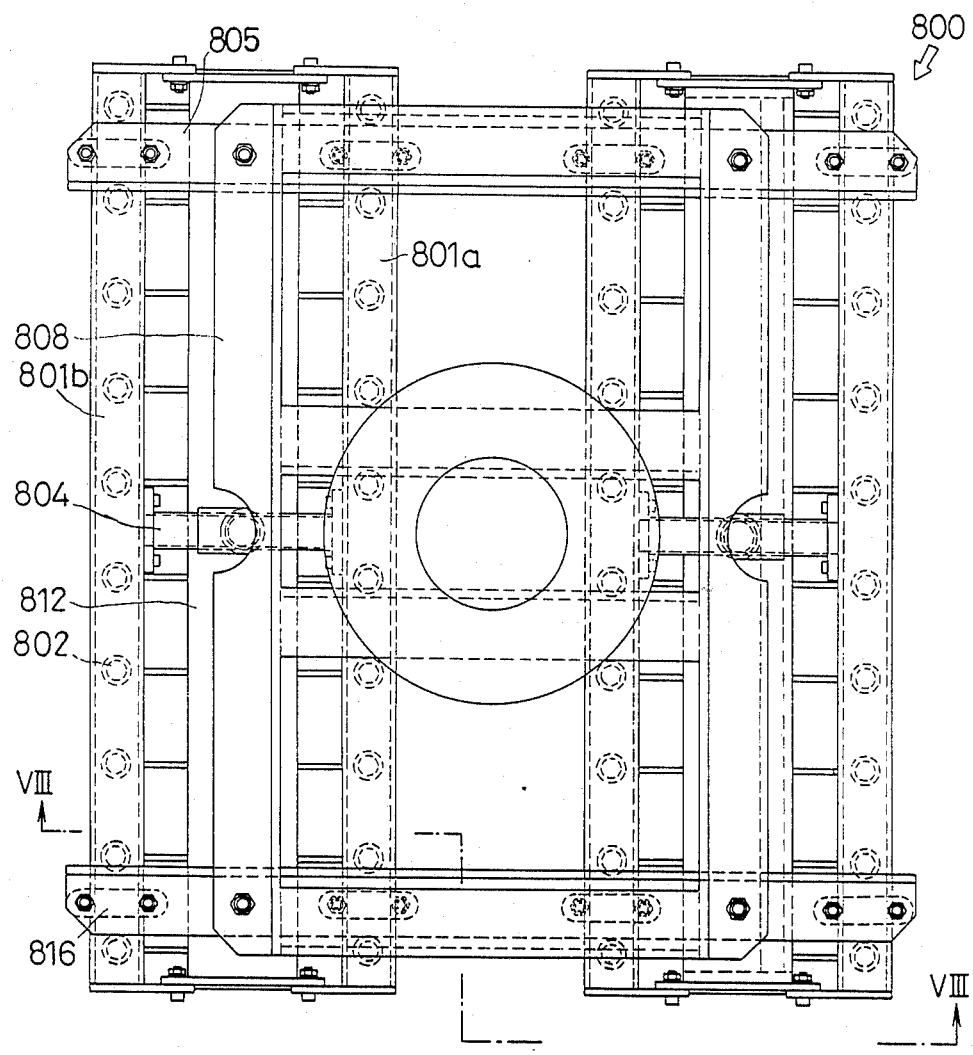
FIG. 26 is a mold release detecting and blowing machine.
Figure 27:
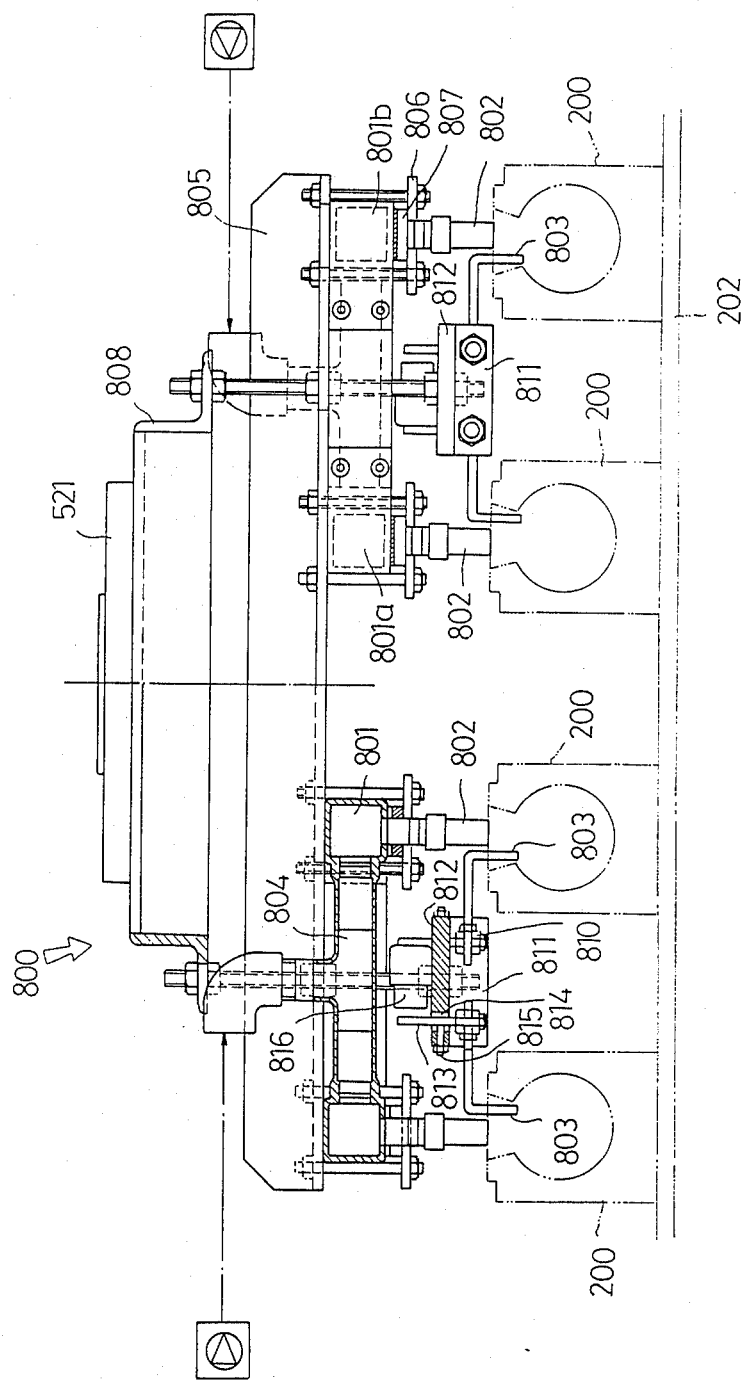
FIG. 27 is a sectional view, taken along the line VIII—VIII in FIG. 26.

The mold release detecting and blowing unit 800 has a blowing portion formed with ten nozzles 802 and a mold release detector having detecting pin 803 at four header pipes 801 in such a manner that the nozzle 802 and the pin 803 are provided at one mold 200 (FIGS. 26 and 27).

The pipe 801 is blocked at both ends in such a manner that the header pipe $801_a$ of an inside row and the header pipe $801_b$ of an outside row adjacent to the pipe $801_a$ are coupled at the center in a T-shaped header supply tube 804 as a set to be coupled to an air blowing pressure air supply device. The blows are alternatively performed at every one set in the supply device. The pipe 801 is supported through a headed bar 807 on a hanger seat plate 806 hung from a hanger 805, which is vertically hung through a frame 808 from the flange 521.

The mold release leakage detector is provided at the lower intermediate between the pipe $801_a$ and the pipe $801_b$.

The pin 803 is formed in a L-shape, and secured fixedly to a shaft 810 in the state extended downward at the end. Five pins are secured to one shaft 810 as a set, and eight sets are used in response to the disposition of the molds 200.

The shaft 810 is rotatably supported to eight shaft mounting plates 811, which are hung from a limit switch mounting plate 812, which is supported by a bolt extended for coupling the frame 808 with the hanger 805.

A limit pusher 813 is upwardly projected fixedly to the shaft 810, and a hole 814 for projecting the pusher 813 through the hole is perforated at the plate 812. The hole 814 has a size capable of rocking the pusher 813, and a bolt 815 for restricting the rocking range is provided in the hole 814. A limit switch 816 is provided at the position separable from the pusher 813 by the rocking motion of the pusher 813 and is provided on the plate 812. The pusher 813 has a moment of direction isolated from the switch 816 by the gravity of the pin 803, and set to be steadily fixed in the state contacted with the bolt 815.

The switch 816 is coupled to the stopping device and the alarm generator of the following works.

The switchings of the blowing time and the blowings of the blowing portions divided into two sets are composed to be controlled by a timer.

Figure 28:
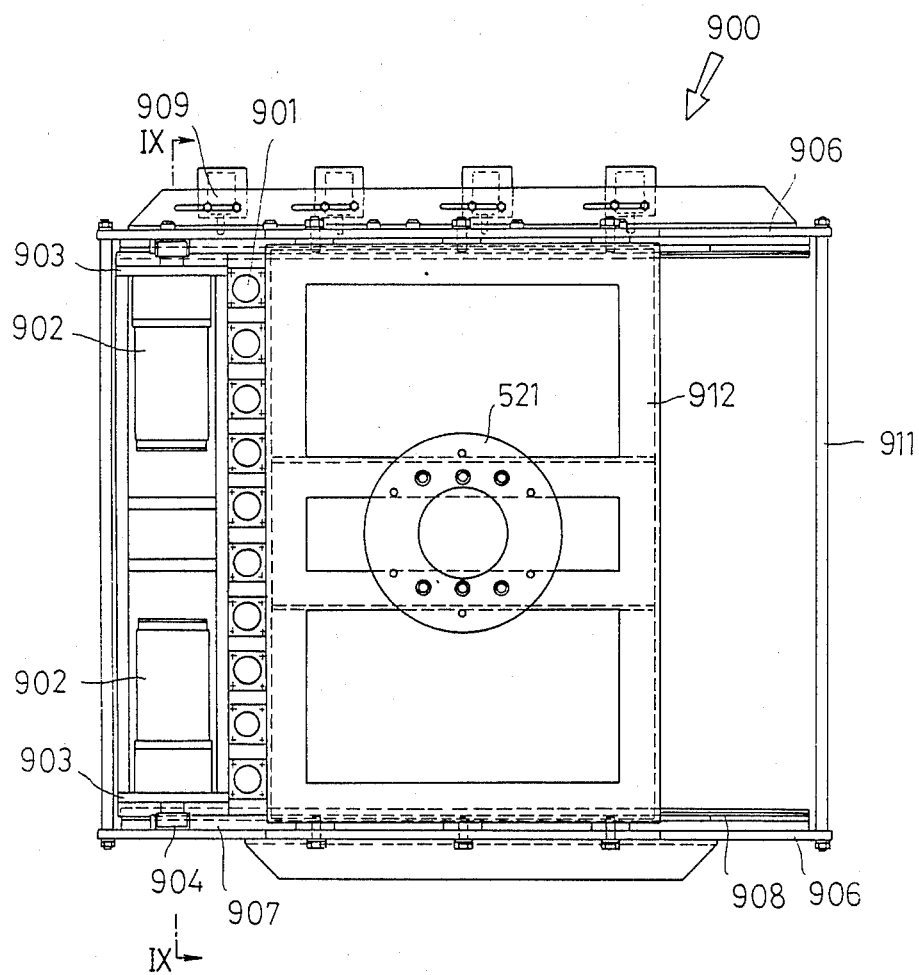
FIG. 28 is a plan view of a raw material charging unit.
Figure 30:
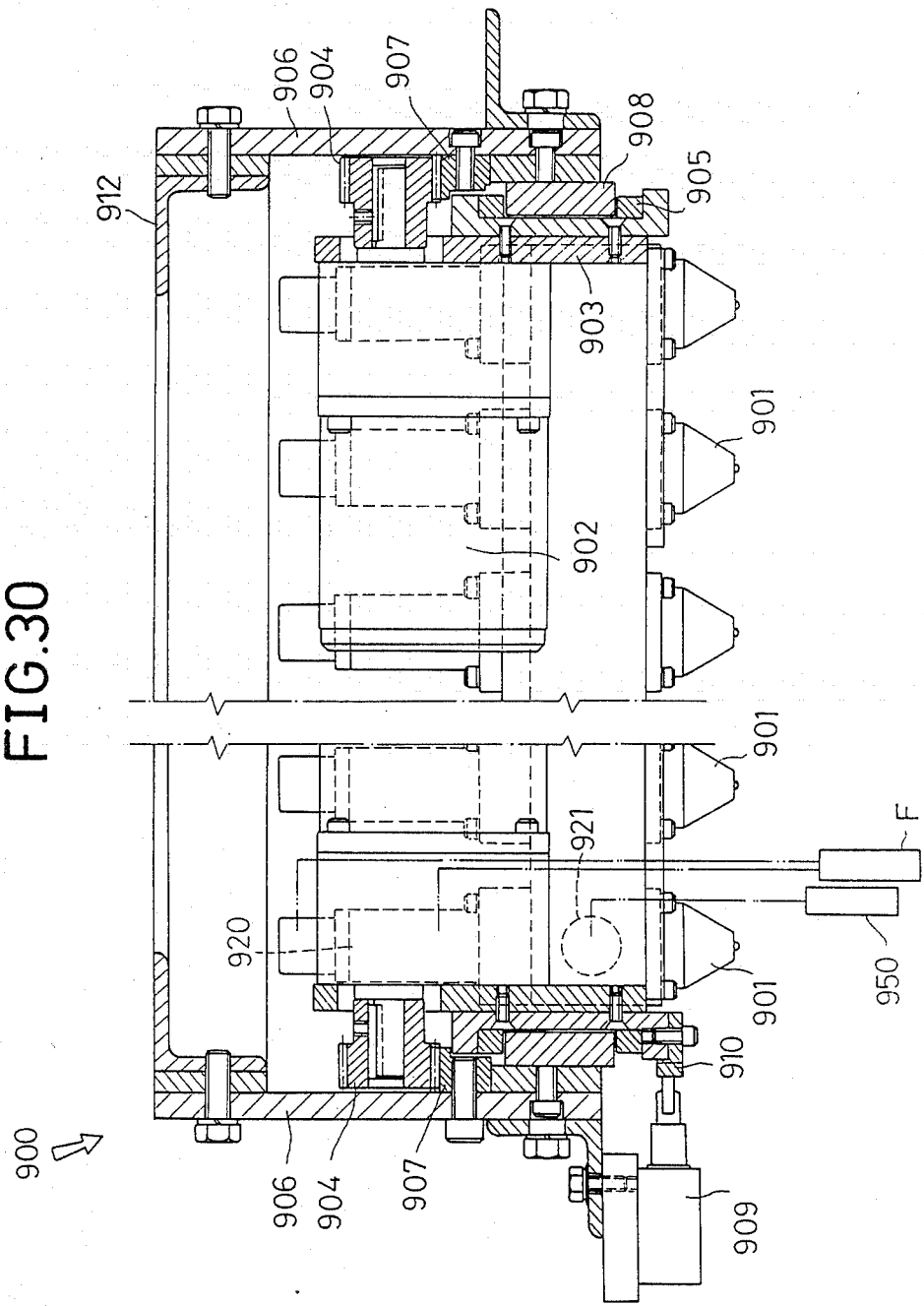
FIG. 30 is a sectional view partly omitted, taken along the line IX—IX in FIG. 28.
Figure 31:
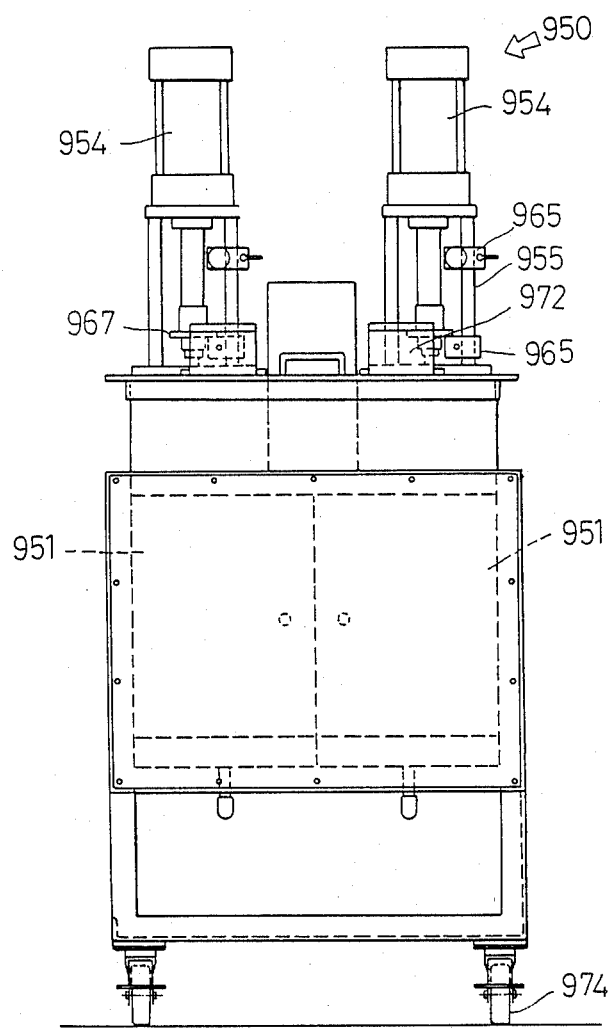
FIG. 31 is a front view of a raw material supplying unit.
Figure 32:
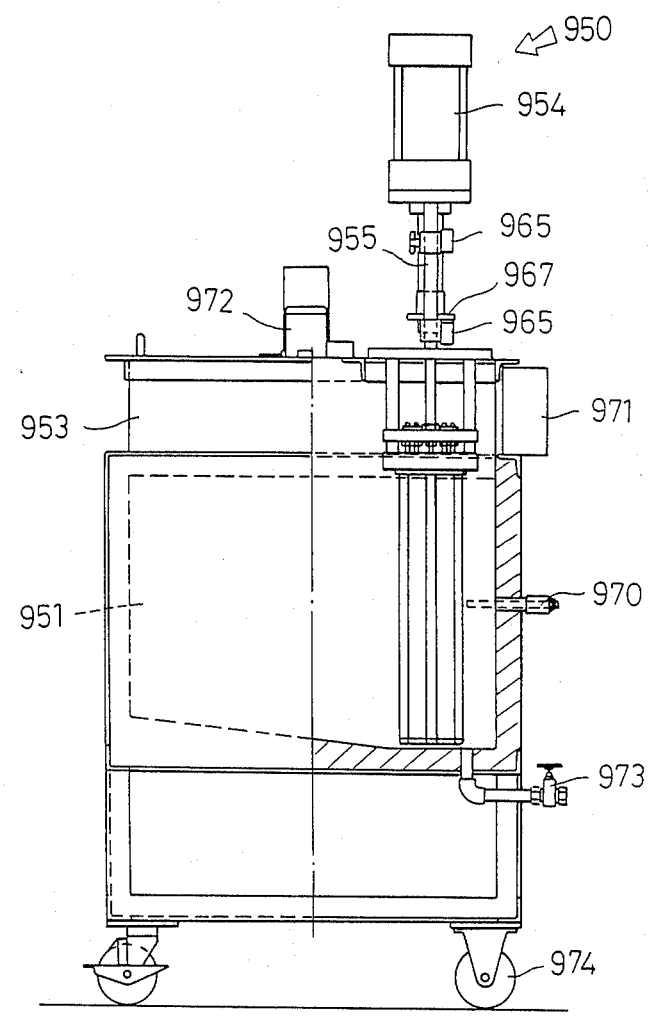
FIG. 32 is a fragmentary side view of the part of the supplying unit.
Figure 33:
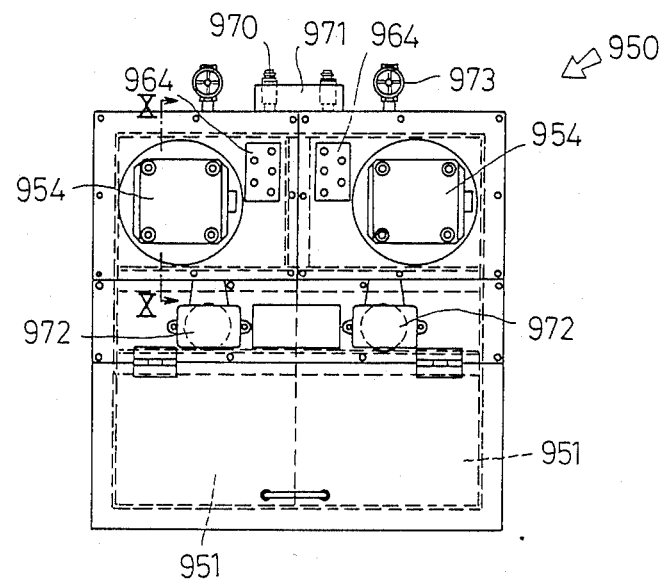
FIG. 33 is a plan view of the supplying unit.
Figure 34:
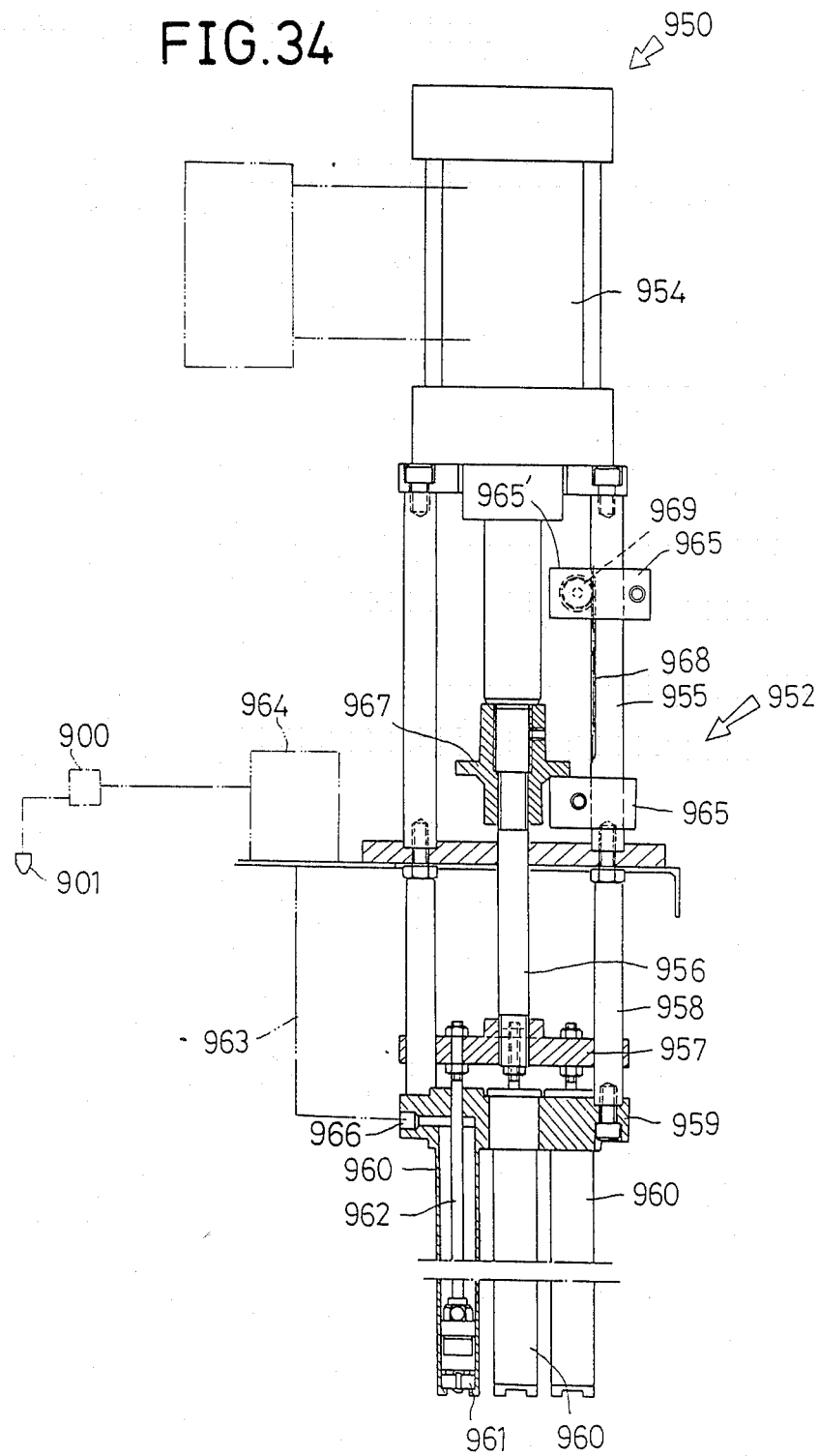
FIG. 34 is a sectional view, taken along the line X—X in FIG. 33.

The raw material charging unit 900 has 10 integral units of injection nozzles 901 of one row provided in response to the ten molds 200 of the frame 201 at every frame 201 to be movable to communicate via the pipe with the raw material supplying unit 950 (FIGS. 28 to 30).

The ten nozzles 901, aligned integrally with a valve body block, is secured to a frame, on which geared motors 902, 902 are installed. This frame has end plates 903, 903 at both longitudinal ends, pinions 904 coupled to the motors 902 are projected from the plates 903, and slide blocks 905 are securedly fixed to the frame.

On the other hand, guide rail mounting plates 906, 906, which are coupled by a tie rod 911, are provided at the hanger 912 secured to the flange 521, and have racks 907, 907 engaging in mesh with the pinion 904, and guide rails 908, 908 engaged with the slide block 905 are provided on the opposed inner surfaces. Four limit switches 909 are provided at an interval of four rows of the molds 200 on the lower ends of one guide rail mounting plate 906, and a cam dog 910, at the position capable of contacting the limit switch 909, is at the lower end of the guide rail 908 of the side faced with the switch 909.

The nozzle 901 has an injection valve driven by a cylinder 920. In other words, the valve body and the valve sheet of the valve unit 921 are secured to the lower end of the cylinder, and a valve stem is secured to the lower end of the piston. The cylinder 920 is piped to the hydraulic fluid device F, and the valve unit 921 is piped to the raw material supply unit 950 (FIG. 30).

The nozzle 901 may be formed in the shape capable of charging a raw material by simultaneously or partly selecting the nozzles 910 in response to the molds.

The supplying unit 950 has pumps 952 provided in the respective tanks 951, 951 partitioned into two tanks for storing raw material solids, and piped to the charging unit 900 (FIGS. 31 to 34).

Trucks 953 having therein the tanks 951, 951, in turn, have cylinders 954, 954 supported at the top by a column 955, and a press rod 956 secured to the lower end of the piston of the cylinder 954 to be inserted into the tank 951. A press plate 957 is provided at the lower end of the press rod 956. A pump head 959 is provided at the lower end of the guide rod 958 of the plate 957, and five pump cylinders 960 are provided in the pump head 959. A valve 961 is disposed at the lower end of the cylinder 960, and the press plate 957 is suspended from the pump piston 962 in the cylinder 960.

The outlet 966 of the pump is connected to five-integral sockets 964 opened at the truck 953, and the sockets are piped to the nozzle 901 of the unit 900.

Two limit switches 965, 965 are provided at an interval in the elevational direction at the column 955, and a cam dog 967 is engaged with the top of the rod 956 between the limit switches 965 and 965. The column 955 having the switches 965, 965 has a rack 968 having scales, and slidably has the pinion 969 engaging in mesh with the upper limit switch 965 at the rack 968 on the mounting plate 965' to control the stroke of the cylinder 954. The pinion 969 can be secured.

The same or different types of raw materials are stored in two tanks 951, 951 as required, and can be fed selectively under pressure by a pump 952 to the unit 900 by a switching valve.

Heaters are provided in the tanks 951, and a temperature detector 970 and a temperature control box 971 are provided to be able to control the temperature of the solid state raw material.

In FIGS. 31 to 34, reference numeral 972 designates a level gauge, reference numeral 973 is a drain valve, reference numeral 974 is wheel, and the cylinder 954 is coupled to the hydraulic fluid device.

A chute or conveyor for receiving the molded products is installed under the portion for superposing the turning locuses of the mold releasing unit 700 at both turning positions of the arm 502 in the vicinity of the column 503 of the robot mechanism D. A supporting rod, or a lateral rod or a paying rod is provided in the height capable of contacting the molded product suspended and rotatably moved to the unit 700 at the chute or the conveyor to forcibly drop the molded products not dropped. A boiling mechanism for degreasing and shaping the recovered molded products is aligned in parallel with the molding machine.

The molding step of plastic raw material will be described. For the convenience of description, one mold holding mechanism $A_1$ of the mold holding mechanism A is filled with the raw material in the mold 200, fed through the heating furnace B and completely cooled in the cooling chamber C, and the other mold holding mechanism $A_2$ is under the state in the furnace B (FIG. 2).

The turntable 101 of the mechanism $A_1$ is turned by the motor 107, and the mold 200 group are moved to the mold release and raw material charging position. The turntable 101 is locked at this position, the arm 102 is set and locked to the position where four rows of the mold group 200 are aligned horizontally and in the predetermined direction.

On the other hand, the arm 502 of the robot mechanism D is rotated by the motor 507, and moved and locked to the mold release and raw material charging position of the mechanism $A_1$.

The shaft 512 is first rotated by the motor 515, the mold cover opening and closing unit 600 is disposed and locked onto the mold 200 group. Then, the unit 600 is moved downward by the cylinder $517_1$, the electromagnet 602 is input to engage the mold cover 210 through the magnetic pieces 213 with the unit 600, the cylinder 603 is then operated to open the clamp hooks 216, 216, thereby releasing the engagement of the molds 200 group with the mold cover 210. Thereafter, the unit 600 is raised by the cylinder $517_1$ in the state that the mold cover 210 is held at the bottom, and the cover is then fully opened.

Subsequently, the lock of the shaft 512 is released, the shaft 512 is then rotated, the mold releasing unit 700 is disposed on the mold 200 group and locked. Then, the unit 700 is moved down to the position capable of holding the molded product by the hole of the mold 200 via the chuck saws 703, 703 by the cylinder $517_2$. At this time, the saws 703 is opened by the cylinder 702, the saw 703, 703 are then closed to hold the molded product by the cylinder 702. After grasping the molded product, the cylinder 702 is rotated by the cylinder 707, the cylinder 715 is operated. Then, the saws 703, 703 are raised while rotating, and the molded product is pulled out from the mold 200 while being twisted. Simultaneously with the steps, the unit 700 is raised by the cylinder $517_2$, thereby finishing the mold release.

The molded product is dropped by operating the cylinder 702 on the chute and opening the saws 703, 703, the molded product not dropped is wiped off by the supporting rod, recovered to the recovery box, and led to the boiling step of the next step as required.

Subsequently, the lock of the shaft 512 is released, the shaft 512 is then rotated, the mold release detecting and blowing unit 800 is disposed and locked on the vacant mold 200 group. Then, the detecting pin 803 is moved down by the cylinder $517_3$ to the position for colliding with the molded product when the product is still in the mold 200. In this case, when the product remains in the mold 200, the pin 803 is collided with the product, the shaft 810 rotates to bring the limit pusher 813 into contact with the limit switch 816, and the next operation is stopped by the limit switch 816, and the molded product is removed by manually or other means by the alarm such as a buzzer or the like.

Further, compressed air is, for example, alternatively blown from the nozzle 802 by a timer at every one set, and the mold 200 is cleaned. After cleaning, the unit is raised by the cylinder $517_3$.

Successively, the lock of the shaft 512 is released, the shaft 512 is then rotated, and the unit 900 is disposed on the cleaned mold 200 group and locked.

Then, the unit 900 is moved down to the position where the hole of the nozzle 901 is faced with the hole of the mold 200 by the cylinder $517_4$. At this time the nozzle 901 row is disposed on the end row in the mold row, and solid-state raw material of plastic is charged into the mold 200 of this row. In charging the raw material, the cylinder 950 of the unit 950 is operated to automatically fill the quantitative amount of the solid-state raw material. The supply amount is regulated by the stroke of the piston of the cylinder 960. When the charging is finished, the nozzle 901 row is temporarily raised by the cylinder $517_4$, moved by the motor 902 onto the next mold row, and moved down again, charged, similarly continuously charged to complete the charging, and the unit 900 is raised and returned to the standby position.

The lock of the shaft 512 is eventually released, the shaft 512 is then rotated, the mold cover opening and closing unit 600 for holding the mold cover 210 is disposed at the lower position, and moved down by the cylinder $517_1$. The input of the electromagnet 601 is released at the position where the electromagnet 602 is contacted with the magnetic piece 213, the clamp hooks 216, 216 close the themselves by the cylinder 603 at the position capable of engaging the connection units 204 of the clamp column 203, thereby completing the closing of the cover of the mold 200.

Since two spiders 117, 117 are provided in the mechanism $A_1$, the spider spindles 113 are rotated to continuously work similarly the other molds 200.

When the molds 200 of the mechanism $A_1$ are charged completely with the raw material, the turntable 101 is released from locking and rotated, and the molds 200 are stopped and locked at the position where the molds 200 are heated in the furnace B. The furnace B contains the molds 200, and the door 302 is then closed, and the molds are heated by the burners 303. At this time, the spindles 113 are rotated around the axial center of the spindle as a center, and around the axial center of the arm 102 as a center, and the molten skin layer is formed on the inner wall of the mold 200 in the preferable state.

After the heating is finished, the door 302 is opened, the turntable 101 is released from locking, rotated, and the mold 200 is moved into the cooling chamber C, and locked.

After the shutter 402 of the chamber C is moved down, pressure water is sprayed from the nozzles, and the fan 403 is operated for cooling.

The spindle 113 is rotated, cooled, and the molten skin layer in the mold 200 can be efficiently cooled and solidified.

The other mold holding mechanism $A_2$ is finished at the heating position when the mechanism $A_1$ is disposed at the cooling position to the mold release and raw material charging position, and moved, after cooling, to the mold release and raw material charging position. The robot mechanism D is also rotated to the mold release and raw material charging position of the mechanism $A_2$, and similar automatic works are executed for the molds 200 of the mechanism $A_1$.

In the embodiments described above, the units are moved in rotating and elevational linear motions of the robot mechanism D in the elevational axis as a center. However, the present invention can be constructed so that the units are moved in the horizontal axis as a rotary axis by providing the units along the axis of the rotatable support and moving by the horizontal linear motions.

According to the present invention as described above, the conventional drawbacks and disadvantages can be eliminated to provide a method of automatically molding thermoplastic synthetic resin without manual operation and the molding machine therefor, the efficiency of the work can be enhanced by the automation of the rotation molding facility adapted for a mass production with remarkably inexpensive cost.

What is claimed is:

1. A method of automatically molding a hollow synthetic resin product from a plurality of molds having a cover and connected to means for charging, heating and cooling the mold and moving the mold through the various process steps, which comprises the steps of:
   processing each molded product from at least four stations positioned along a multi-sided perimeter;
   sequentially detecting the molding release of each mold, the step of detecting occurring at a first station;
   blowing air into the inside of the mold to clean it, the step of blowing occurring at the first station;
   charging a certain amount of the raw moldable material into the mold in a solid state, the step of charging occurring at the first station;
   closing the cover of the mold, the step of closing occurring at the first station;

inserting the mold into a single heating furnace at a second station opposite the first station;

rotating the mold in a rotational manner to form a synthetic resin melted skin layer on the inner wall of the mold;

moving the mold into one of two cooling chambers located at a third station and a fourth station opposite each other; alternately heating another mold in the single heating furnace and then cooling the mold in an unoccupied cooling chamber;

cooling the synthetic resin melted skin layer of the cooling chamber while rotating the mold;

moving the mold from the cooling chamber to a molding release unit located at the first station;

opening the cover of the mold, the step of opening occurring at the first station;

removing the molding from the mold whereby each mold is sequentially subject to the same steps, the step of removing occurring at the first station; and automatically moving the molds among at least the first, second, third, and fourth stations.

2. An automatic method of molding a synthetic resin doll in an automatic manner at different stations, in which a molding apparatus comprises an automatic control mechanism for controlling the steps of the molding process, at least two molds, a pair of mold holding mechanisms, robot mechanisms subject to the automatic control mechanism for rotating mechanisms capable of opening and closing the covers of the mold, releasing moldings from the molds, detecting a molding release, cleaning the molds and providing means for charging a moldable raw material into the mold, and a heating mechanism and a pair of cooling mechanisms which comprise the steps of:

arranging the molding apparatus over six stations positioned along a multi-sided perimeter so that at least two molds may be automatically moved among the six stations;

moving a first mold to a first station, adjacent the robot mechanisms;

detecting a molding release of the first mold of a mold holding mechanism at the first station;

cleaning the inside of the first mold to remove any residue material at the first station;

charging a predetermined amount of the raw material into the first mold in a solid state at the first station;

closing the cover of the mold at the first station;

translating the first mold and a second mold from a second station and a third station, and alternately inserting the first mold and the second mold into a heating furnace of said heating mechanisms at a fourth station diametrically opposite the first station;

rotating the first mold in a rotational manner to form a synthetic resin melted skin layer on the inner wall of the first mold with a hollow center core;

translating the first mold into a cooling chamber of one of said cooling mechanisms to provide a fifth station, the other cooling mechanism providing a sixth station for the second mold, the sixth station being diametrically opposite the fifth station so that the fourth station is intermediate the fifth station and the sixth station;

cooling the synthetic resin melted skin layer of the cooling chamber while rotating the first mold;

moving the first mold from the cooling chamber to the molding release unit of the first station;

opening the cover of the mold;

removing the molding from the mold, whereby the order of molding steps with the second mold occurs simultaneously with that of the first mold and only offset in sequence to permit a common sharing use of the robot mechanisms and heating mechanisms.

3. A method of molding a synthetic resin doll according to claim 2, wherein air is blown into the mold to clean the interior of the mold before charging the solid raw material into the mold.

4. A method of molding a synthetic resin doll according to claim 2 further including means for grasping the molding and rotating the molding while lifting it out of the mold.

* * * * *